(12) United States Patent
Solomita

(10) Patent No.: US 7,581,052 B1
(45) Date of Patent: Aug. 25, 2009

(54) APPROACH FOR DISTRIBUTING MULTIPLE INTERRUPTS AMONG MULTIPLE PROCESSORS

(75) Inventor: Ethan Solomita, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 737 days.

(21) Appl. No.: 11/210,163

(22) Filed: Aug. 22, 2005

(51) Int. Cl.
G06F 13/24 (2006.01)
G06F 9/46 (2006.01)

(52) U.S. Cl. ............... 710/267; 710/260; 718/105

(58) Field of Classification Search ........... 710/48, 710/260, 264, 266–269; 718/105
See application file for complete search history.

(56) References Cited

U.S. PATENT DOCUMENTS

| | | | | |
|---|---|---|---|---|
| 5,099,414 | A * | 3/1992 | Cole et al. ............. | 709/207 |
| 5,517,626 | A * | 5/1996 | Archer et al. ........... | 710/110 |
| 6,032,245 | A * | 2/2000 | Georgiou et al. ......... | 712/23 |
| 6,237,058 | B1 * | 5/2001 | Nakagawa ............. | 710/260 |
| 6,711,643 | B2 * | 3/2004 | Park et al. ............. | 710/260 |
| 2003/0105798 | A1 * | 6/2003 | Kim et al. ............. | 709/105 |
| 2003/0200250 | A1 * | 10/2003 | Kiick .................. | 709/102 |
| 2005/0078694 | A1 * | 4/2005 | Oner .................. | 370/412 |
| 2006/0112208 | A1 * | 5/2006 | Accapadi et al. ........ | 710/265 |
| 2007/0079039 | A1 * | 4/2007 | Raj ................... | 710/260 |

OTHER PUBLICATIONS

PlanetMath.org Encyclopedia. Entry 'trimmed mean'. Online Oct. 7, 2004. retrieved from Internet Oct. 24, 2008. <http://planetmath.org/encyclopedia/TrimmedMean.html>.*
Reinefeld, A. et al. "Work-Load Balancing in Highly Parallel Depth-First Search". Aug. 1994. IEEE. 0-8186-5680. pp. 773-780.*
Schulman, Jerold. "JSI Tip 2191. Bind device interrupts to a particular processor in Windows 2000". FAQ for Windows. Mar. 24, 2000. InstantDoc#73512. Retrieved from Internet Jul. 30, 2008. http://windowsitpro.com/articles/print.cfm?articleid+73512>.*
Gountanis, R.J. et al. "A Method of Processor Selection for Interrupt Handling in a Multiprocessor System", Proceedings of the IEEE. vol. 54 No. 12. Dec. 1966. pp. 1812-1819.*

* cited by examiner

*Primary Examiner*—Thomas J Cleary
(74) *Attorney, Agent, or Firm*—Osha • Liang LLP

(57) ABSTRACT

A method and apparatus for distributing multiple interrupts among multiple processors is disclosed. According to one embodiment, an interrupt daemon monitors the interrupt load among the processors that results from an initial mapping of the interrupts to the processors. The interrupt daemon determines whether there is a sufficient imbalance of the interrupts among the processors. If so, the interrupt daemon triggers a reassignment routine that generates a new mapping of the interrupts among the processors, and if not, the interrupt daemon goes to sleep for a specified time period. If the new mapping produces a sufficient improvement in the distribution of interrupts among the processors, based on the same criteria used to detect the imbalance, the new mapping is used by the central hub for subsequent distribution of interrupts to the processors. However, if the new mapping does not provide a sufficient improvement, the original mapping continues to be used.

24 Claims, 7 Drawing Sheets

APPROACH FOR DISTRIBUTING MULTIPLE INTERRUPTS AMONG MULTIPLE PROCESSORS

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Interrupts are generated by devices in a computer, other than by the main central processing unit (CPU), which are to be processed by the CPU. As used herein, the term "interrupt" means an asynchronous event that requests that the CPU stop normal processing activities to handle the asynchronous event. Defining an interrupt as an asynchronous event means that the interrupt occurs without regard to what is currently being processed by a CPU. In contrast, synchronous events, such as traps, occur synchronously with the processing of an application by the CPU, such as a trap that occurs when a program tries to divide by zero or when an application tries to access memory that does not exist.

In general, any device besides the CPU that is part of the computing system can generate an interrupt. For example, devices that generate interrupts include, but are not limited to, the following: disk drives, keyboards, cursor control devices such as mice and trackballs, printers, USB ports, and network controllers. When a computing system is first powered up, the operating system interrogates each device to discover what interrupts each device can generate. In general, each device can generate any number of different interrupts.

The interrupts described herein are generated by hardware devices, as compared to other types of interrupts that are software constructs and that act to interrupt a program or application. For example, software interrupts are generated by the CPU itself and are sent to that same CPU for processing. In contrast, the term "interrupt" as used herein refers to interrupts that are generated by devices other than the CPU, and thus excludes such software interrupts. Although both software interrupts and hardware interrupts are handled similarly once received by a CPU, the software interrupts do no go to another device, such as a central hub that distributes interrupts among CPUs, since the software interrupts are generated by the same CPU that processes the software interrupt.

When devices generate interrupts in a single CPU computing system, a central hub receives the interrupts and then sends the interrupts them to the CPU for processing. The central hub may be also referred to as an "interrupt concentrator." Upon receiving an interrupt, the central hub pre-digests the interrupt to put the interrupt into a standard representation before sending the interrupt to the CPU for processing. Upon receipt of an interrupt by the CPU, the CPU stops the normal processing being performed for applications to process the interrupt, because interrupts are given higher priority for processing by CPUs as compared to applications.

In a multi-CPU computing system, the multiple CPU's may be included in the same computing device, such as a multiprocessor server, included in separate devices such that each device includes a single CPU, or a combination of single processor devices and multiprocessor devices. With a multi-CPU system, the central hub not only pre-digests the interrupts, but the central hub also determines to which CPU to send a particular interrupt for processing. With multiple CPUs, the central hub uses a mapping of the different interrupts to CPUs to determine to which CPU to send each interrupt from a particular source. Based on the interrogation of the system's devices at startup, the central hub knows all the possible interrupts that could be received from the system's different devices. Using that list of all possible interrupts, the central hub maps each interrupt from each source device to a CPU of the system following the interrogation of the devices to determine the interrupts that each device can generate. The assignment of interrupts to CPUs is described in more detail herein.

As a result of the approach used to assign interrupts to CPUs, not all interrupts for a particular device will be handled by the same CPU, nor will all interrupts of a particular type from multiple devices of the same type go to the same CPU. However, once a particular interrupt from a particular device is mapped to a CPU, all instances of the particular interrupt from the particular device are handled by the same CPU, unless and until the mapping of interrupts to CPUs is changed, which is discussed further herein.

For example, in a dual CPU system, with the two CPUs designated by the identifiers "cpu0" and "cpu1," a disk drive generates interrupts "dd_irq0" and "dd_irq1," while each of two network controllers, designated as network controllers A and B, generate interrupts "nc_irq0" and "nc_irq1." The central hub uses the following mapping of the interrupts to the two CPUs to determine which CPU is to be sent which interrupt: interrupt "dd_irq0" to "cpu0," interrupt "dd_irq1" to "cpu1," interrupt "nc_irq0" from network controller A to "cpu0", interrupt "nc_irq1" from network controller A to "cpu1," and both interrupts "nc_irq0" and "nc_irq1" from network controller B to "cpu1." As a result, "cpu0" processes one disk drive interrupt (e.g., interrupt "dd_irq0") and one network controller interrupt from network controller A (e.g., interrupt "nc_irq0"), while "cpu1" processes all the other interrupts.

In a multiple CPU computing system, one approach for assigning interrupts to CPUs is to assign all interrupts to a single CPU. However, this approach may result in unacceptable performance if the CPU is overwhelmed by the interrupts or a high priority interrupt monopolizes the CPU at the expense of lower priority interrupts. Another approach is to use a round robin scheme to distribute the interrupts among the CPUs. For example, in a dual CPU system, after interrogating the devices to determine which interrupts can be generated, the central hub assigns the first interrupt in a list of the possible interrupts to "cpu0," the second interrupt on the list to "cpu1," the third interrupt to "cpu0," the fourth interrupt to "cpu1," and so on, alternating between the two CPUs. If more than two CPUs are included, the interrupts are assigned to the CPUs in order, and when the last CPU is reached, the central hub starts over with "cpu0."

The round robin approach is better than assigning all of the interrupts to a single CPU, such as "cpu0." However, because some interrupts are more processing intensive and take up a larger portion of the CPU's processing resources, some CPUs may spend very little time processing interrupts, while other CPUs may at times be processing only interrupts without any CPU time being made available to applications.

One technique for minimizing the impact of processing interrupts on the processing of applications is to designate some CPUs as "eligible" for handling interrupts while other CPUs are designated as "ineligible" for handling interrupts. Then the ineligible CPUs can be the preferred choices for running applications, since those CPUs would not be adversely affected by the handling of interrupts that are concentrated among the interrupt eligible CPUs.

One problem with this approach is that some interrupt eligible CPUs will have much higher interrupt loads than others, which can adversely impact the processing of applications or even the other interrupts assigned to the high interrupt load CPUs. Another problem is that users may not know or be able control which CPUs run which applications, so some applications may still be processed by interrupt eligible CPUs. In some cases, an application be handled by a CPU with a large interrupt load, thereby adversely impacting application performance.

While most interrupts are not very processing intensive, some specific types of interrupts can potentially require a significant amount of a CPU's processing resources. For example, network controller interrupts, especially for some modern high capacity networks such as 10 Gigabit networks that receive a large amount of packet traffic, potentially can require a very significant amount of a CPU's processing resources. At times, the network traffic can be sufficiently high, either from legitimate uses or from a malicious attack on the network, that the CPU handling a particular interrupt for that network controller can be spending 100% of the CPU's processing time handling the particular network controller interrupt from that network controller. Such a CPU can be described as having an interrupt load of 100% because all of the CPU's processing resources are dedicated to processing the network controller interrupt from that high traffic network controller.

If the interrupts are assigned to the eligible CPUs in a round robin approach, any applications that are being executed on a 100% network controller interrupt loaded CPU will not be able to be processed at all by the CPU until the traffic on the network controller goes down sufficiently so that the CPU no longer has a 100% interrupt load. Even if the interrupt load is less than 100%, the amount of the CPU's processing resources that are available for use by the applications may result in unacceptable performance of the applications.

The problem of a CPU being completely loaded and overwhelmed by interrupt processing can be particularly troublesome when interrupts are prioritized. For example, with the Solaris operating system from Sun Microsystems, Inc., network controller interrupts are typically given a higher priority than other device interrupts, such as from disk drives. As a specific example, in Solaris 10, a priority interrupt level (PIL) is associated with each interrupt, such as a PIL of 6 for network controller interrupts and a PIL of 4 for disk drive interrupts.

If a CPU is assigned to handle both a disk drive interrupt and a network controller interrupt, there can be some time periods during which the network controller interrupt is taking up all the processing resources of the CPU. When this occurs, the CPU never processes the interrupt from the disk drive, such as during time periods of heavy network traffic. This can be a very significant problem in a computing system that has a single file system that is made up of hundreds of individual disk drives. Because the CPU sees the file system as a single device, once a single disk drive in the file system generates an interrupt for the CPU being dominated by the network controller interrupt, all the disk drives are essentially prevented from operating because the CPU never is able to process that first interrupt from the single disk drive, thereby preventing any other interrupts from any of the other disk drives from being processed as well.

One improvement on the round robin approach is to weight interrupts, so that the number of other interrupts that are assigned to the same CPU as a processing intensive interrupt are minimized. For example, in Solaris 10, network controller interrupts are given a much larger weight than other interrupts, so that once a network controller interrupt is assigned to a particular CPU, many more non-network controller interrupts would be assigned to the other interrupt eligible CPUs before another interrupt is assigned to the same CPU as the network controller interrupt. By using sufficiently large weights for such resource intensive interrupts, some CPUs can effectively be assigned only a single resource intensive interrupt.

However, one problem with the weighting approach is that while some interrupts have the potential to at times command 100% of the CPU's processing time, at other times, there may be little or no interrupt load from that interrupt on the CPU, depending the network traffic conditions at a particular time. Thus, the round robin and weighting approaches can result in some CPUs consistently having much higher interrupt loads while other CPUs consistently have much lower CPU loads, resulting in an unbalanced situation. In particular, with either the round robin or weighting approaches of assigning interrupts, there will typically be times when the system is unbalanced because some CPUs have little or no interrupt load, whereas at other times, some CPU's have interrupt loads at or near 100%.

The round robin and weighting approaches can be described as static interrupt assignment approaches because the interrupts remain assigned to the same CPUs, unless a special event occurs that triggers a reassignment of all of the interrupts. For example, the static interrupt assignment approaches typically only reassign interrupts when CPUs are added or removed from the computing system, provided that the system is capable of handling such additions and deletions of CPUs without being restarted. As another example, the static interrupt assignment approaches may reassign all the interrupts when changes are made regarding which CPUs are either eligible or ineligible to process interrupts. In other systems, changes to the available CPUs or the interrupt eligible CPUs may require a restart of the system so that the interrupts can be reassigned.

In contrast to the static interrupt assignment approaches described above, a dynamic interrupt assignment approach can be used that takes into account the actual interrupt loads on the CPUs and then reassigns an interrupt from one CPU to another to better distribute the total interrupt load for the system among the interrupt eligible CPUs. For example, in Solaris 8 for x86 processors, an interrupt assignment approach is used that considers all the CPUs processing interrupts and identifies both the CPU with the biggest interrupt load and the CPU with the smallest interrupt load. The approach is then to try to move one interrupt from the high load CPU to the low load CPU in an attempt to establish a better balance of the interrupts for the system. But this simplistic approach is still unable to handle pathological situations, such as with a network controller interrupt that is taking up 100% of the CPU, because moving that interrupt to another CPU does not change the fact that one CPU will be dominated by that network controller interrupt. Also, this dynamic approach only looks at the highest and lowest loaded CPUs and only tries to move one interrupt at a time between that pair of CPUs. In some situations, repeated reassignments results in the same interrupt being moved back and forth between the same two CPUs, without any overall improvement in the system's performance. In fact, the repeated reassignment of the same interrupt impacts the system's performance because the system is expending resources to move that interrupt back and forth repeatedly.

Note that when describing the moving of an interrupt between CPUs, a particular instance of an interrupt that is being processed by a CPU remains on that CPU until processing of that instance of the interrupt is complete. However, when the interrupt is moved from one CPU to another CPU, the mapping of interrupts to CPUs used by the central hub is updated so that when another instance of the same interrupt is later received by the central hub, the new instance of the interrupt is sent to the newly assigned CPU instead of the originally assigned CPU.

Another dynamic interrupt assignment approach is incorporated into the "irqbalance" daemon that is part of Linux. A daemon is an application that runs in the background and is generally not visible to the user because the daemon does not generate any windows or other effects that the user normally sees via the user interface. With "irqbalance," a simple analysis of the interrupt loads on the eligible CPUs is made every ten seconds, and based on that interrupt load information, interrupts are reassigned among the eligible CPUs. This approach is better than the simple dynamic approach described above because multiple CPUs are considered and multiple interrupts can be moved. However, "irqbalance" has several drawbacks.

One problem with the "irqbalance" approach is that there is a performance impact from executing "irqbalance" every 10 seconds. Because the performance measurement and reassignment activities require some processing time on the CPU on which the "irqbalance" daemon is executing, there are less processing resources available for executing other applications on that CPU.

Another problem with "irqbalance" is that by frequently moving interrupts between CPUs, there is a performance impact based on the use of "warm" caches. A "warm" cache is a cache that already includes some or all of the information needed to handle a particular interrupt. Each time an interrupt is moved to another CPU, the new CPU has a "cold" cache because that interrupt was not previously handled on that CPU. When the first instance of that interrupt is processed by the new CPU, the information needed by the CPU to process the interrupt gets loaded into the CPU's cache since that information was not previously included in the cache. While subsequent instances of that particular interrupt on the CPU may be able to use a "warm" cache, the cache may only be warm for the 10 second interval before interrupt is yet again be moved to another CPU.

Yet another problem with "irqbalance" is that a 10 second sleep interval is used, but otherwise "irqbalance" does not keep track of the time while executing. Therefore, if during execution, "irqbalance" is interrupted for a period of time, say half of a second because the CPU is processing an interrupt, the interrupt load information may be inconsistent because the load information is taking over a relatively long time period that includes the half-second delay in collecting the interrupt load information. In particular, the interrupt load of a particular CPU may be very different after that half-second delay, due to the normal variation in interrupt loads. This can result in the moving of interrupts that otherwise would not be moved if the load information were collected over a shorter time period so that the interrupt load information was more representative of the different CPUs' interrupt loads at the same point in time.

Finally, another problem is that "irqbalance" is designed for typical implementations of Linux on computing systems with a small number of CPUs, usually only two or four CPUs. As a result, there is no provision in "irqbalance" for dynamic provisioning of CPUs, such as the addition or removal of a CPU from the system without restarting the system. Also, "irqbalance" is unable to address the changing of the designations for CPUs as to whether a particular CPU is eligible or not eligible to process interrupts. In a computing system with a small number of CPUs, such changes are likely to be infrequent, but in larger computing system with dozens or even hundreds of CPUs, the ability to handle the addition and removal of CPUs without having to restart the entire system can be very important. Therefore, "irqbalance" is unable to properly accommodate CPU provisioning in computer systems with more than a handful of CPUs.

In summary, while the dynamic approaches for assigning interrupts are generally better than static interrupt assignment approaches, the dynamic approaches described above still have significant drawbacks. As a result, it is desirable to provide improved techniques for distributing multiple interrupts among multiple CPUs. It is also desirable to have improved techniques for handling situations in which a single interrupt can dominate a particular CPU.

SUMMARY

An approach for distributing multiple interrupts among multiple processors generally involves generating a heuristic based on the interrupt load on the processors that results from distributing the interrupts to the processors based on a mapping of the interrupts to the processors. For example, the heuristic can be used to assess the interrupt imbalance among the processors. When the heuristic satisfies a criterion, another heuristic is generated based on another interrupt load on the processors that Would result if the interrupts were distributed to the processors based on another mapping of the interrupts to the processors. For example, when an interrupt imbalance is identified based on the original heuristic, a new mapping of interrupts to processors is generated. When the other heuristic satisfies another criterion, the interrupts are distributed to the processors based on the other mapping. For example, when the new mapping would result in a sufficiently improved heuristic, the new mapping is used for distributing the interrupts to the processors. However, if either heuristic fails to satisfy the corresponding criterion, the original mapping continues to be used to distribute the interrupts to the processors. For example, if either the original heuristic fails to show a sufficiently large interrupt imbalance or the other heuristic fails to show a sufficient improvement in the interrupt imbalance, the original mapping of interrupts to processors continues to be used. After the original mapping is used for a specified amount of time, the generating of the two heuristics is repeated. For example, periodic checks are made to determine whether an interrupt imbalance exists.

The original heuristic can be generated based on one or more quantities, including but not limited to, the average total load per processor, the total load of each processor, and a modified total load of each processor that excludes the largest load from an individual interrupt on each processor. Specifically, the average total load per processor can be determined based on the interrupt load among the processors, such as by averaging each processor's total interrupt load. For each processor, the processor's total interrupt load less the average total interrupt load per processor can be determined as one measure of the interrupt imbalance for the processor. If the result is less than zero, the result can be set equal to zero. Also, for each processor, the processor's total interrupt load less the largest individual interrupt load can be determined as another measure of the interrupt imbalance for the processor. Then the minimum value of the two measures of the interrupt balance for the processor can be used as the indication of the processor's interrupt imbalance. In addition, if the total interrupt load for each processor satisfies another criterion, the measure of the interrupt's imbalance can be set to a specified value. Finally, after a heuristic is determined for each processor handling the interrupts, a system heuristic can be determined based on the individual processor heuristics, such as by taking the largest individual processor heuristic as the system heuristic or averaging the individual processor heuristics to calculate the system heuristic. The other heuristic used to determine whether to use the new mapping can be generated in a similar manner.

In some implementations, the system heuristic is based on two or more separate system heuristics that are determined at different times, thereby resulting in a time-based average system heuristic. Also, a baseline heuristic can be used to compare a given system heuristic to determine whether a sufficiently large interrupt imbalance has occurred.

To generate the new mapping of interrupts to processors, a pair of processors is selected in which one processor has a total interrupt load above the average total interrupt load per processor and the other processor has a total interrupt load below the average total interrupt load per processor. Individual interrupts are then redistributed between the two processors such that the high load processor's total interrupt load is reduced and that the high load processor continues to have a higher total interrupt load than the low load processor. Based on the redistribution of interrupts between the two processors, the new mapping is generated. Additional pairs of processors can be selected and have the interrupts redistributed between the pair in a similar manner, resulting in additional information that is reflected in the new mapping.

Interrupt loads can be redistributed between processors by performing an optimization search, such as a depth first search or a breadth first search. The search tree that corresponds to the optimization search can use one or more pruning rules to avoid expressly evaluating some possible redistribution of interrupt loads that would not improve the final result. For example, one possible pruning rule is that when a new best result is identified, all further results below that new best result in the tree are pruned. As another example, another possible pruning rule is that when adding all possible interrupt loads below an intermediate result in the tree would not provide an acceptable result relative to the goal, all further results below the intermediate result are pruned.

According to other aspects, the invention encompasses a machine-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF EMBODIMENT(S)

Figure 1:
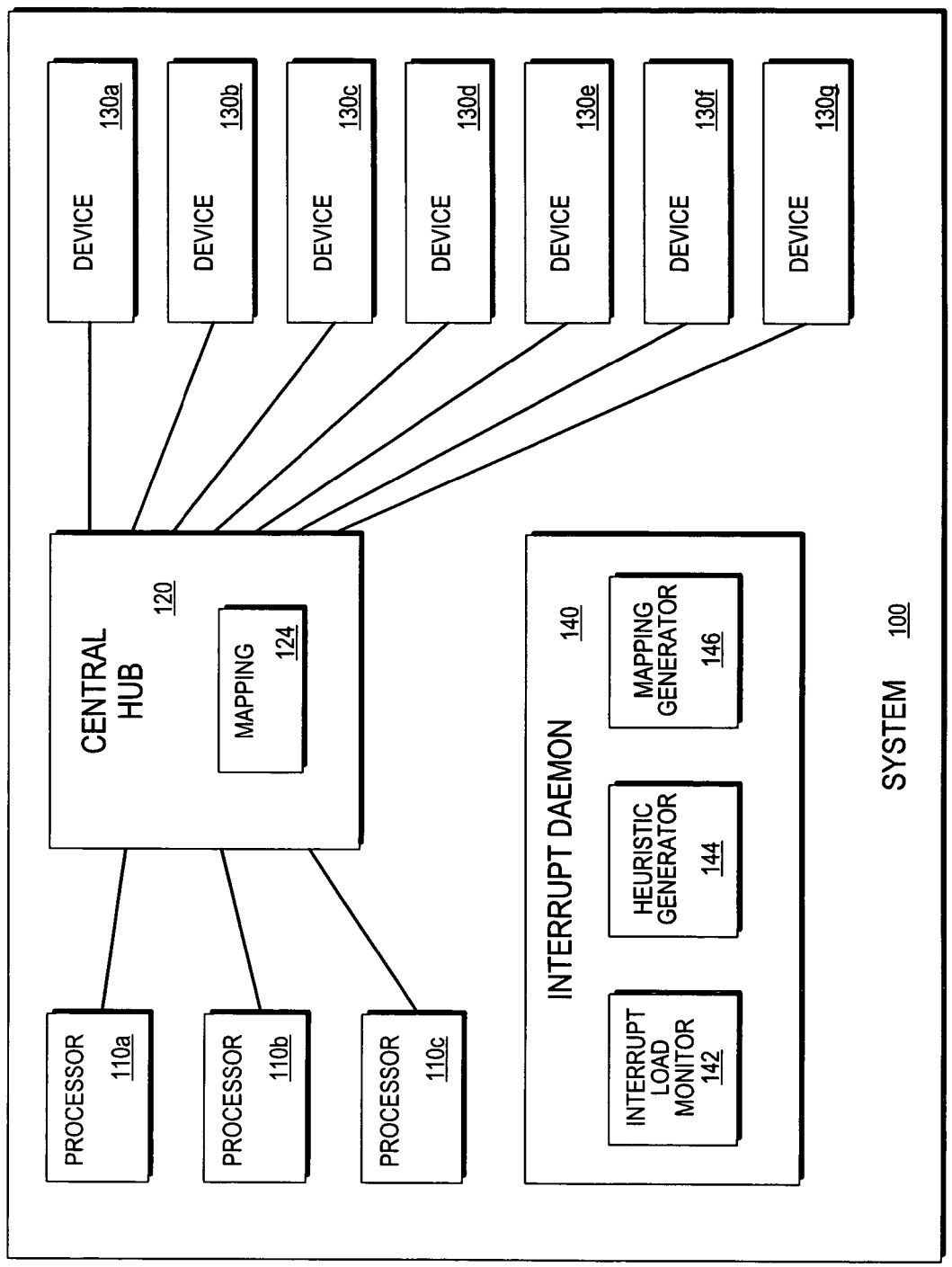
FIG. 1 is a block diagram that depicts a high level overview of the hardware and system elements of a system for distributing multiple interrupts among multiple processors, according to an embodiment.

A method and apparatus for distributing multiple interrupts among multiple processors is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

1.0 OVERVIEW
   1.1. Structural Overview of Distributing Interrupts Among Processors
   1.2 Functional Overview of Distributing Interrupts Among Processors
2.0 MEASURING AN INTERRUPT IMBALANCE
   2.1 Determining the Average total interrupt Load per Processor
   2.2 Determining a Heuristic for Each Processor
      2.2.1 Processor Load Less Average Load
      2.2.2 Processor Load Less Largest Individual Load
      2.2.3 Selecting the Minimum Heuristic Value
      2.2.4 Pathological Situations
   2.3 Determining a Heuristic for the System
3.0 TRIGGERING A REASSIGNMENT OF INTERRUPTS
   3.1 Establishing a Baseline for Comparison
   3.2 Time-Based Average System Heuristic
   3.3 Use of a Margin for Triggering a Reassignment
   3.4 Setting a Measurement Interval
4.0 GENERATING A NEW MAPPING OF INTERRUPTS TO PROCESSORS
   4.1 Maintaining Consistency with Imbalance Detection
   4.2 Sorting Processors by Interrupt Load
   4.3 Selecting the High Load Processor
   4.4 Selecting the Low Load Processor
   4.5 Redistributing Interrupts Among the High and Low Load Processors
   4.6 Determining if the Redistribution of Interrupts is Acceptable
5.0 USING THE NEW MAPPING OF INTERRUPTS TO PROCESSORS
   5.1 Determining if the New Mapping is a Sufficient Improvement
   5.2 Applying the New Mapping
   5.3 Updating the Baseline
6.0 OPTIMIZING THE REDISTRIBUTION OF INTERRUPTS
   6.1 Depth First Search without Pruning
   6.2 Depth First Search with Pruning
      6.2.1 Pruning Rule 1
      6.2.2 Pruning Rule 2
      6.2.3 Final Result of Applying Pruning Rules 6.3 Breadth First Search
7.0 ADDITIONAL FEATURES
7.1 Automating the Selection of Values
7.2 Grouping Interrupts on Processors Based on Priority
7.3 Tight vs. Broad Distribution of Interrupts Among Processors
8.0 IMPLEMENTATION MECHANISMS AND HARDWARE OVERVIEW
9.0 EXTENSIONS AND ALTERNATIVES 1.0 Overview Techniques are provided for distributing multiple interrupts among multiple processors. According to one embodiment, an interrupt daemon periodically measures the interrupt load among the processors that results from an initial mapping of the interrupts to the processors. The interrupt daemon determines whether there is a sufficiently large imbalance of the interrupts among the processors as compared to a previously determined baseline. If so, the interrupt daemon triggers a reassignment routine that generates a new mapping of the interrupts among the processors, and if not, the interrupt daemon goes to sleep for a specified time period. If the new mapping produces a sufficiently large improvement in the distribution of interrupts among the processors, based on the same criteria used to detect the imbalance, the new mapping is used by the central hub for subsequent distribution of interrupts to the processors. However, if the new mapping does not provide a sufficient improvement, the original mapping continues to be used. Regardless of whether the new mapping is used, the baseline is updated.

By separating the detection of an interrupt imbalance from the reassignment of interrupts by generating a new mapping of interrupts to processors, system resources are not wasted by generating a new mapping when the interrupts are reasonably well balanced. Also, because imbalance detection is relatively quick as compared to generating the new mapping, the balance of interrupts among the processors can be closely monitored without a significant adverse impact on system performance. Furthermore, even when a new mapping is generated, system resources are not wasted when the new mapping does not sufficiently improve the balance of interrupts. As a result, the balance of interrupts among the processors of the system can be closely monitored, yet system resources are conserved by generating the new mapping of interrupts to processors and then implementing the new mapping when such actions are warranted by the benefit that can be obtained by doing so. Otherwise, generating the new mapping or implementing the new mapping is avoided when not warranted by the benefit that can be expected by generating the new mapping or implementing the new mapping.

1.1 Structural Overview of Distributing Interrupts Among Processors

FIG. 1 is a block diagram that depicts a high level overview of the hardware and system elements of a system 100 for distributing multiple interrupts among multiple processors, according to an embodiment. FIG. 1 depicts a small number of processors and devices, although in practice any number of processors and devices can be used with the techniques described herein. For purposes of simplifying the following explanation, the processors and devices are depicted separately, but in practice, any number of processors and any number of devices can be included in any number of separate apparatuses.

System 100 includes processors 110a, 110b, 110c, a central hub 120, devices 130a through 130g, and an interrupt daemon 140. Processors 110a, 110b, 110c are communicatively coupled to central hub 120, so as to facilitate the distribution of interrupts received by central hub 120 to the appropriate processor. Likewise, devices 130a through 130g are communicatively coupled to central hub 120, so as to facilitate the sending of interrupts by devices 130a through 130g to central hub 120 for distribution to the appropriate processor from among processors 110a, 110b, 110c. Although not depicted in FIG. 1 for the sake of clarity, processors 110a, 110b, 110c, central hub 120, and devices 130a through 130g, typically include other connections that communicatively couple each other and other devices, processors, and apparatuses.

Processors 110a, 110b, 110c represent different processing components, such as different microprocessors, that may be included in one or more different apparatus, such as one or more central processing units (CPUs). Devices 130a through 130g represent any number of different types of non-processor devices, including but not limited to, the following: disk drives, keyboards, cursor control devices such as mice and trackballs, printers, USB ports, and network controllers One or more of processors 110a, 110b, 110c and one or more of devices 130a through 130g may be part of one or more separate apparatuses. For example, system 100 can include two general-purpose computers, one with processor 110a and devices 130a through 130c that represent a keyboard, disk drive, and printer, respectively, and another with processors 110b and 110c and devices 130d through 130g that represent a keyboard, a USB port, a network controller, and a disk drive.

Central hub 120 includes a mapping 124 that represents how different interrupts from devices 130a through 130g are assigned for processing by processors 110a, 110b, 110c. Mapping 124 can be generated by one or more of the techniques described herein. Although central hub 120 is depicted separate from processors 110a, 110b, 110c, devices 130a through 130g, and interrupt daemon 140, central hub 120 may be co-located with one or more of processes 110a, 110b, 110c, devices 130a through 130g, and interrupt daemon 140.

As a specific example of mapping 124, device 130b may represent a disk drive that generates two interrupts, dd_irq0 and dd_irq1, and mapping 124 indicates that interrupt dd_irq0 is assigned to processor 110a while dd_irq1 is assigned to processor 110b. As another example, device 130f may represent a network controller that generates three interrupts, nc_irq0, nc_irq1, and nc_irq2, all of which are assigned based on mapping 124 to processor 110c. The remaining interrupts generated by devices 130a through 130g are likewise assigned via mapping 124 to processors 110a, 110b, 110 c, such that each instance of a particular interrupt from particular device is sent by central hub 120 to the assigned processor for processing.

Interrupt daemon 140 is responsible for monitoring the interrupt load among processors 110a, 110b, 110c, generating heuristics for the individual processors and the system as a whole, detecting when an imbalance occurs, and then generating a new mapping that may be used by central hub 120 for the subsequent distribution of interrupts among processors 110a, 110b, 110c. Interrupt daemon 140 may be executing on one of processors 110a, 110b, 110c, although for clarity interrupt daemon 140 is depicted being separate from processors 110a, 110b, 110c in FIG. 1. Also, interrupt daemon 140 can migrate among processors 110a, 110b, 110c, and therefore, interrupt daemon 140 is not limited to remaining on a particular processor.

As depicted in FIG. 1, interrupt daemon 140 includes an interrupt load monitor 142, a heuristic generator 144, and a mapping generator 146. However, other implementations may include more or few modules than those depicted in FIG.

1, and other implementations may rearrange the functions performed by the modules depicted in FIG. 1 among one or more modules. Also, the functions of interrupt daemon 140 are not limited to being implemented with a daemon. For example, the functions of interrupt daemon 140 can be implemented using other types of applications besides daemons, as part of the operating system, as one or more processes, or in hardware.

Interrupt load monitor 142 gathers interrupt load information for processors 110a, 110b, 110c. The load of each interrupt can be expressed as a percentage of the total processing capacity of the processor. For example, an interrupt with a load of 50% (or 0.5) indicates that half of the processor's processing capacity is currently dedicated to processing the interrupt. Interrupt load monitor can also aggregate the individual interrupt loads for each processor to determine the total interrupt load per processor, along with averaging the total interrupt loads for all the processors to determine an average total interrupt load per processor.

Heuristic generator 144 generates heuristics that represent the balance of interrupts for each processor of processors 110a, 110b, 110c, and then based on the individual processor heuristics, heuristic generator 144 generates a system heuristic for system 100. For example, the techniques described herein can be used to determine specific heuristics for processors 110a, 110b, 110c, and then the system heuristic for system 100 can be determined as the worst individual processor heuristic, the average processor heuristic, or some other appropriate measure of the interrupt balance among the processors for the system.

Based on the system heuristic, interrupt daemon 140 can determine if the interrupt load among the processors is sufficiently out of balance to warrant triggering an attempt to reassign the interrupts among the processors. While the monitoring of the interrupt loads and heuristic generation generally do not consume a significant amount of system resources, the generation of a new mapping of interrupts to processors can be more computationally intensive, along with the fact that using a new mapping can reduce the benefit of using warm caches. Therefore, the effort to reassign the interrupts among the processors is undertaken only when the imbalance in the interrupt load for system 100 is sufficiently large to warrant the remapping effort.

If the system is sufficiently imbalanced, mapping generator 146 is triggered to generate a new mapping of the interrupts from devices 130a through 130g to processors 110a, 110b, 110c. Interrupt daemon 140 can then have a new system heuristic generated by heuristic generator 144 based on the individual interrupt loads being redistributed among the processors based on the new mapping. If the new system heuristic indicates that the new mapping provides a sufficiently improved interrupt balance, interrupt daemon 140 can send the new mapping to central hub 120 to replace the original mapping. Thereafter, central hub 120 distributes interrupts from devices 130a through 130g to processors 110a, 110b, 110c based on the new mapping 124.

However, if the new mapping does not provide a sufficiently improved interrupt balance for system 100, the new mapping is not sent to central hub 120. Even though the expense of generating the new mapping has been incurred, the impact on system performance, such as due to the effect on warm caches from redistributing interrupts among the processors, may be sufficiently large to warrant only implementing the new mapping when the expected improvement from using the new mapping is sufficiently large, as determined based on one or more criteria, as described further below.

1.2 Functional Overview of Distributing Interrupts Among Processors

Figure 2:
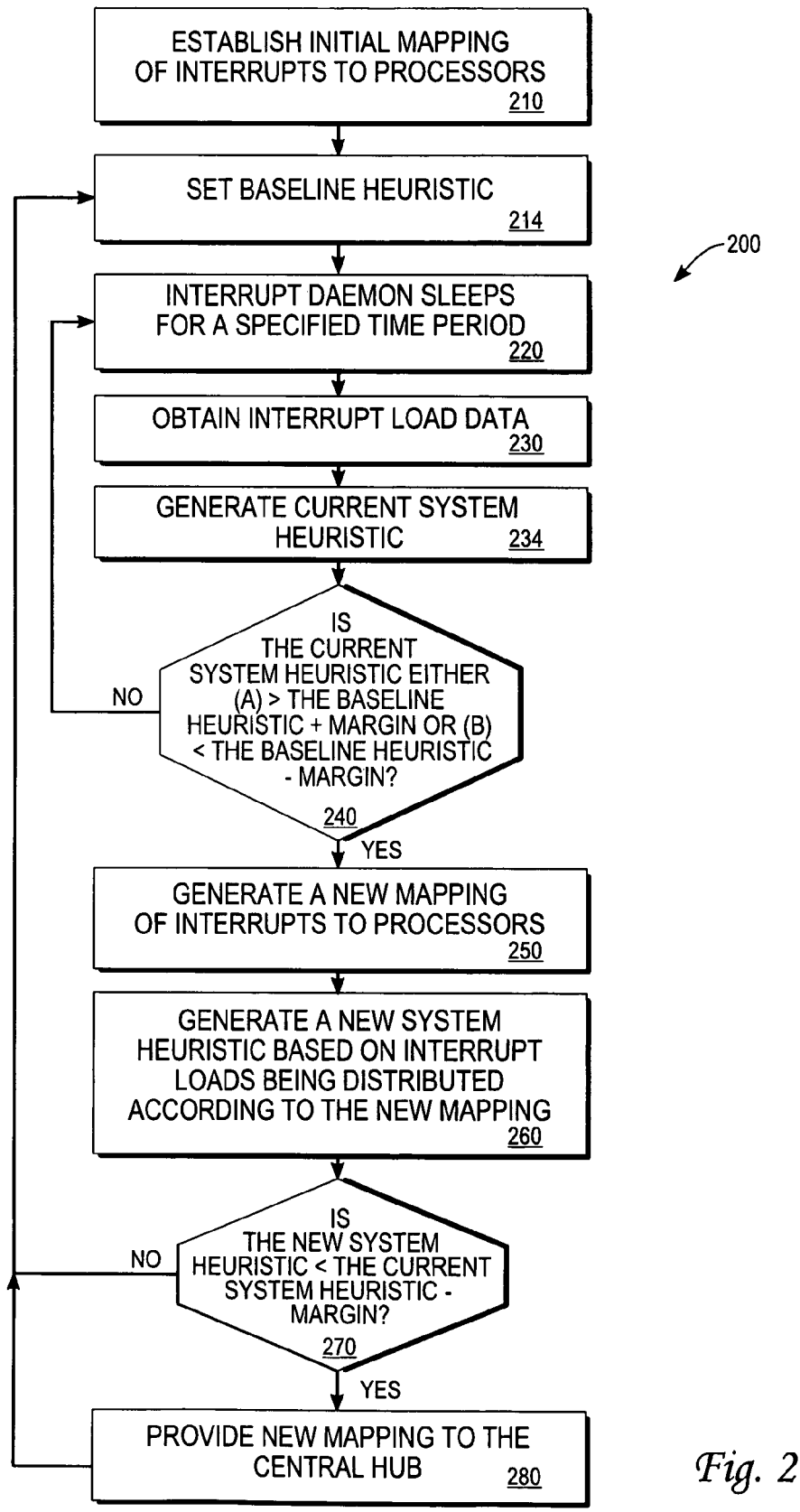
FIG. 2 is a flow diagram that depicts an approach for distributing multiple interrupts among multiple processors, according to an embodiment.

FIG. 2 is a flow diagram 200 that depicts an approach for distributing multiple interrupts among multiple processors, according to an embodiment. FIG. 2 is described with reference to system 100 of FIG. 1, although FIG. 2 is not limited to system 100 of FIG. 1.

Flow diagram 200 begins with block 210, in which an initial mapping of interrupts to processors is established. For example, central hub 120 can be configured to use one of the static interrupt assignment approaches described above, such as the round robin or weighting approaches, to initially assign the interrupts from devices 130a through 130g to processors 110a, 110b, 110c. Because at the startup of the system there is little or no interrupt load data available, the dynamic approaches described herein would be less useful than they typically would be following the operation of system 100 for a length of time sufficient to generate meaningful interrupt load information.

In block 214, the baseline heuristic is set. For example, interrupt daemon 140 can wait for a specified period of time after the startup of the system, such as 60 seconds, and then direct interrupt load monitor 142 to obtain interrupt load information from processors 110a, 110b, 110c. Based on the interrupt load information, heuristic generator 144 generates individual heuristics for each processor and then a system heuristic for system 100. The system heuristic is then used as the baseline heuristic for subsequent interrupt load monitoring and system heuristic comparisons. Generation of the heuristic values is described in more detail below with respect to blocks 230 and 234.

For example, assume that a baseline heuristic value of 0.35 is determined based on a heuristic value scale of 0 to 1 in which 0 represents the best result and 1 represents the worst result. Subsequent system heuristics are compared to the baseline heuristic value of 0.35 to determine if there is a sufficiently large imbalance to trigger a reassignment of interrupts to processors. Note that the heuristic value does not necessarily correspond to the interrupt load on a processor as expressed as a percentage of the processing capacity. Rather, the heuristic is a measure of how far a particular processor is from the best heuristic value of 0, and the heuristic value for a particular processor or the entire system may or may not correspond to an interrupt load on the processor or system.

In block 220, the interrupt daemon sleeps for a specified time period. For example, interrupt daemon 140 can be configured to have interrupt load monitor 142 obtain interrupt load data every 10 seconds. As a result, after interrupt daemon 140 collects the interrupt load data, generates the individual and system heuristics, and determines that the remapping procedure should not be triggered, interrupt daemon 140 goes to sleep for 10 seconds. Alternatively, interrupt daemon 140 can be configured to sleep for a sufficiently long period such that the next set of interrupt load information is gathered at or about 10 seconds after the previous interrupt load data was gathered, or interrupt daemon 140 can be configure to sleep for a sufficient length of time that the next set of interrupt load information is gathered at a particular clock time, such as every quarter minute.

In block 230, interrupt load data is obtained. For example, interrupt load monitor 142 queries each of processors 110a, 110b, 110c to obtain a list of interrupts on each processor and the load of each interrupt on the corresponding processor. The load of an interrupt on a processor can be expressed as a percentage of the processor's total processing capacity. For example, if an interrupt consumes half of the processor's total processing capacity, the interrupt load is 50%.

In block 234, the current system heuristic is generated. For example, based on the interrupt load data from block 230, heuristic generator 144 generates a heuristic for each individual processor based on the interrupt load data for each processor, with the individual processor heuristics representing the imbalance of the interrupt load for that individual processor. Then based on the individual processor heuristic values, heuristic generator 144 generates a system heuristic that represents the current imbalance of the system.

The heuristic value for a processor can be based one or more different calculations and considerations, including but not limited to, the following: (a) comparing the total interrupt load on a processor to the average total interrupt load per processor; (b) determining the total interrupt load on a processor without considering the largest individual interrupt load on the processor; and (c) comparing the total interrupt load on a processor to one or more criteria that, when satisfied, the heuristic is set equal to a specified value. Any number of these different types of heuristic calculations can be used, either alone or in combination, as discussed further below.

After a heuristic value is generated for each interrupt eligible processor, a heuristic value is generated for the system based on one or more of the individual heuristic values for the processors. For example, the system heuristic value can be determined as the average heuristic value of the processor specific heuristic values. As another example, the system heuristic value can be taken as the worst heuristic value from among the individual processor heuristic values. Regardless of the particular approach used, the heuristic value is determined for the system as a whole and then is used to determine if the balance of interrupts among the processors in the system indicates an imbalance for which an attempt should be made to improve the imbalance of interrupts by reassigning interrupts among the processors.

In block 240, a determination is made whether the current system heuristic is either (a) greater than the sum of the baseline heuristic and the margin or (b) less than the difference of the baseline heuristic and the margin. The baseline heuristic is determined above in block 214, while the margin is a specified value, which may be specified within the code of interrupt daemon 140, specified by a user, or even determined by interrupt daemon 140 itself based on past performance. The value of the margin represents the amount by which the system heuristic must deviate from the baseline heuristic to indicate a sufficient change in the imbalance of the interrupt loads among the processors that warrants trying to rebalance the interrupts among the processors. Note that in this example, a deviation from the baseline heuristic in either the bad direction (e.g., the imbalance is worse) or the good direction (e.g., the imbalance is better) warrants trying to rebalance interrupts, although in other implementations, either one or the other criteria can be used.

For example, the margin can be set at 0.1, so that if the baseline heuristic is 0.35, the current system heuristic must be either (a) greater than 0.45 or (b) less than 0.25 to trigger an attempt to rebalance the interrupts. Thus, a current system heuristic of 0.40, although indicating an imbalance of the interrupts among the processors when compared to the baseline heuristic value, is not a sufficiently large enough imbalance to warrant triggering an attempt to rebalance the interrupts among the processors. Note that in other implementations, a different set of criteria can be used, such as determining whether the system heuristic is equal to or greater than the sum of the baseline heuristic and the margin.

If no margin were used and the current system heuristic were merely compared to the baseline heuristic, any increase in the system heuristic over the baseline heuristic would trigger an attempt to rebalance the interrupts among the processors. Since the interrupt loads can vary over time (e.g., based on the activity of the different devices within the system), using a margin of 0 may result in frequent and potentially unnecessary attempts to rebalance the interrupts. By using a margin value in the comparison of the system heuristic to the baseline heuristic, the frequency of rebalance attempts can be controlled so that the performance impact on the system from the resources expended performing the rebalancing attempts is appropriately managed to an acceptable level, while maintaining a reasonable frequency of rebalance attempts to manage the impact of an unequal distribution of the interrupt loads among the processors.

If in block 240, the system heuristic satisfied either of the two criteria, the process continues to block 250, and if not, the process returns to block 220 where the interrupt daemon sleeps for the specified time period.

In block 250, a new mapping of interrupts to processors is generated. For example, mapping generator 146 can sort the interrupt eligible processors from highest total interrupt load to lowest total interrupt load. Then mapping generator 146 can identify a high load processor that is above the average total interrupt load per processor, such as the processor with the highest total interrupt load, and a low load processor that is below the average total interrupt load per processor, such as the processor with the lowest total interrupt load.

Mapping generator 146 then determines an optimal redistribution of interrupts between the high load processor and the low load processor, such as by employing a depth first search approach as described below, to effectively move some of the interrupt loads from the high load processor to the low load processor, thereby resulting in a better balance of the interrupt loads among the two processors. Mapping generator 146 can then select another pair of high load and low load processors to redistribute interrupts among, and so on. After working through all the processors with interrupt loads above the average total interrupt load per processor, mapping generator 146 has produced the new mapping of the interrupts among the processors based on the pair-wise redistribution of interrupts among the processors.

In block 260, a new system heuristic is generated based on the interrupts loads being distributed according to the new mapping. Note that the new mapping has not yet been implemented (e.g., sent to central hub 120 to replace the original mapping 124). Rather, in block 260, a new system heuristic is generated to see the effect of using the new mapping by redistributing the individual interrupt loads based on the interrupt load data according to the new mapping.

For example, heuristic generator 144 generates a new system heuristic based on the assumption that the interrupt loads determined in block 230 were redistributed among the processors based on the new mapping from block 250. The new system heuristic is generated using the same approach described above in block 230 when the previous system heuristic was generated based on actual performance of the system, namely determining individual processor heuristic values for use in determining the system heuristic.

In block 270, a determination is made whether the new system heuristic is less than the difference between the old system heuristic and the margin. For example, assume that the old system heuristic from block 234 is 0.35 and that the margin is 0.10. Then the new system heuristic must be less than 0.25 (e.g., 0.35-0.10). Thus, just as in block 240 in which the margin is used to control how often an imbalance is detected that warrants attempting to rebalance the interrupts, the margin is used in block 270 to control how often the new mapping is actually implemented by central hub 120.

Note that a different margin value can be used in block 270 than in block 240. Also, the value of the margin can be built into interrupt load balancer 140 through the source code, specified by a user through an appropriate interface or configuration file, or set by interrupt load balancer 140 itself based on past performance. Also, a different condition can be used than that the new system heuristic must be less than the baseline heuristic less the margin (e.g., that the new system heuristic is less than or equal to the difference between the baseline heuristic and the margin or that the new system heuristic is less than or equal to the difference between the baseline heuristic and half of the margin).

The use of the margin with the baseline heuristic in block 270 helps to ensure that not only does the new mapping improve the balance of the interrupts among the processors, but the balance is improved by a sufficient amount to warrant the effort in actually implementing the new mapping by central hub 120. Because some processing resources are expending in changing mapping 124 based on the new mapping generated in block 250, and because the redistribution of interrupts among the processors will impact the system performance, such as by reducing the effectiveness of warm caches, some new mappings may improve the system heuristic by a small enough amount that implementing the new mapping is not justified.

If in block 270 the new system heuristic is less than the difference between the old system heuristic and the margin, the process continues to block 280, and if not, the process returns to block 214 where the baseline heuristic is set once again.

Note that in the situation in which the new mapping is not used, the baseline heuristic is still updated. Thus, although the attempt to rebalance the interrupts was not successful, the baseline is updated to reflect the current performance of the system based on the original mapping so that another attempt to rebalance the system is not quickly triggered again, which might occur if the balance of the interrupt loads remains approximately the same as when the attempt to rebalance was triggered in block 240. In effect, this means that the balance of interrupt loads among the processors in the system is about as good as can be achieved. However, if at a later time the balance worsens, such that a subsequent system heuristic as determined in block 234 is sufficiently above the new baseline heuristic (e.g., by at least the amount of the margin as in block 240), another attempt to rebalance the interrupts among the processors is made. Thus, by resetting the baseline heuristic value even if a rebalance is not implemented, the system is to some extent self-regulating.

In block 280, the new mapping is provided to the central hub. For example, interrupt daemon 140 sends the new mapping generated in block 250 to central hub 120 so that central hub 120 can update mapping 124 based on the changes between the original mapping and the new mapping. Thereafter, as interrupts are received by central hub 120, the interrupts are distributed to the processors based on the new mapping, resulting in a more balanced distribution of the interrupt loads among the processors.

2.0 Measuring an Interrupt Imbalance

Using interrupt load data for the processors in a system, a measurement of how balanced the interrupts are across the processors can be determined. In one embodiment, a heuristic value that represents the interrupt imbalance of the system is determined based on individual heuristic values for the interrupt eligible processors. The determination of the individual heuristic values for the processors can be based on one or more different types of heuristic calculations, from which a final heuristic value for the processor is determined.

Figure 3:
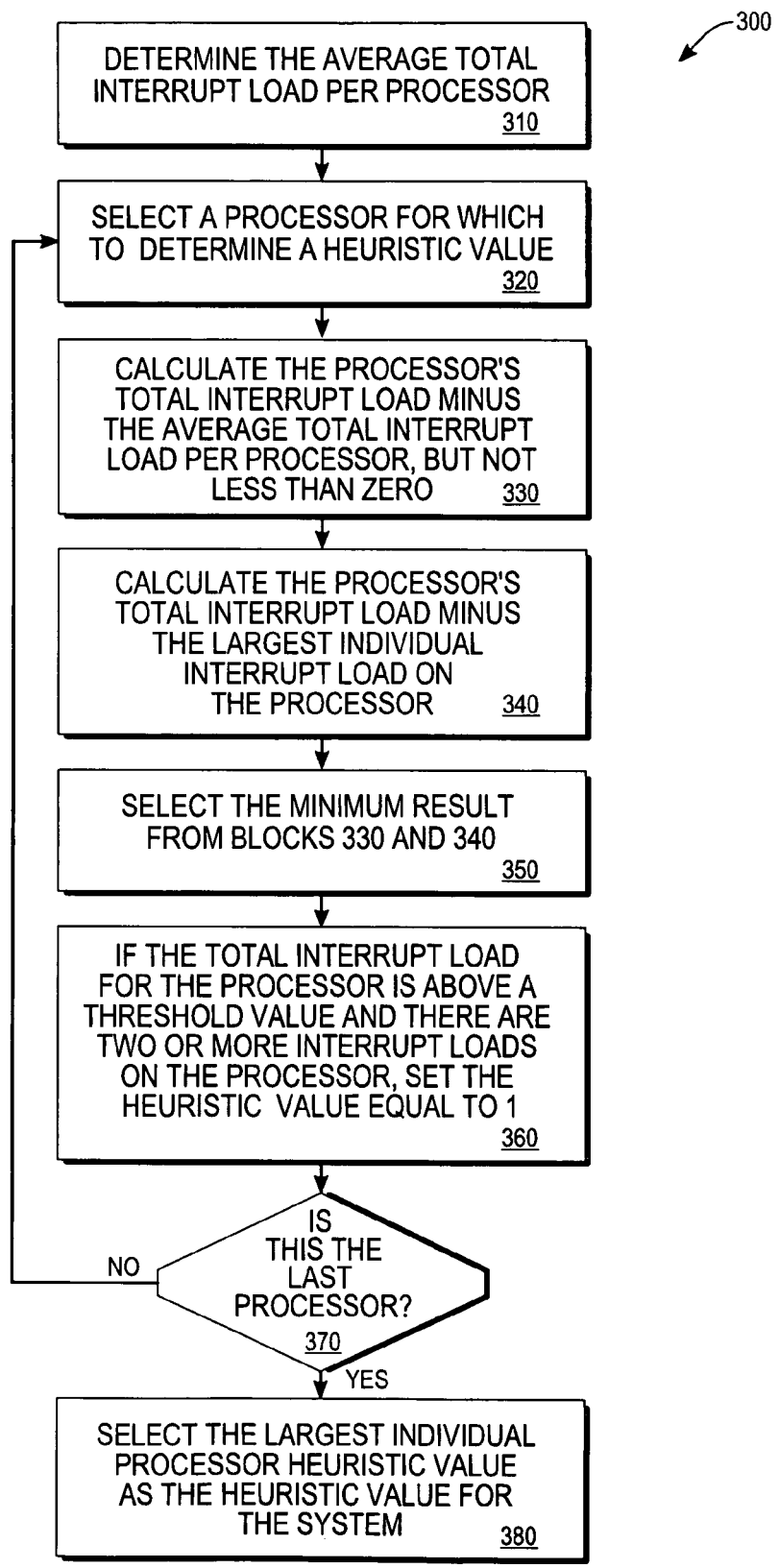
FIG. 3 is a flow diagram that depicts an approach for measuring an interrupt imbalance for a system, according to an embodiment.

FIG. 3 is a flow diagram 300 that depicts an approach for measuring an interrupt imbalance for a system, according to an embodiment. The approach of FIG. 3 determines a system heuristic value that represents the interrupt imbalance for the overall system, based on individual processor heuristic values for each of the processors handling the interrupts. Each processor heuristic value is determined based on three different calculations, for which each different calculation reflects a different consideration when measuring a processor's interrupt load imbalance.

The heuristic determination approach described herein can be used for one or more of the following: measuring interrupt imbalances, detecting a sufficiently imbalanced system, determining whether a possible improvement to the balance of the interrupts provides an improvement or a sufficient improvement, and for setting a baseline heuristic to which later imbalance measurements can be compared. By using the same heuristic determination approach for each purpose, consistency can be maintained so that interrupts are not reassigned in a manner that would not be viewed by the imbalance detection approach as an improvement. However, in other implementations, variations in determining the heuristic for each purpose can be used, or even different types of heuristic determinations can be made for each purpose.

In the example of FIG. 3, the heuristic values are arbitrarily limited to values between 0 and 1, inclusive, with 0 representing the best heuristic value (e.g., an ideal balance of interrupts) and 1 representing the worst heuristic value (e.g., the worst imbalance of interrupts). However, in other implementations, different types of heuristic values and ranges of heuristic values can be used. For example, percentages or whole numbers can be used instead of decimal values. Also, the range of possible heuristic values can be 0 to 100 or −10 to +10, and the lowest value can correspond to the best value while the largest value corresponds to the worst value.

Furthermore, heuristics in other implementations need not even be numerical and can be any type of scheme that indicates relative differences between two or more conditions, such as educational letter grades (e.g., A, B, C, D, F) or any other suitable approach. Finally, in the example of FIG. 3, both the individual processor heuristics and the system heuristics are based on the same range of heuristic values, although in other implementations, different ranges of heuristic values can be used for the processor heuristic values and the system heuristic values.

2.1 Determining the Average total interrupt Load per Processor

In block 310, the average total interrupt load per processor is determined. For example, interrupt load monitor 142 can gather and maintain interrupt load information for each interrupt eligible processor. As a specific example, the operating system, such as Solaris, gathers statistics as each interrupt handler is started and finished and provides the interrupt load information to other entities, such as interrupt load monitor 142. As another example, an event can be triggered whenever an interrupt handled is invoked or completes, and the event is sent to interrupt load monitor 142 of interrupt daemon 140, thereby allowing interrupt load monitor 142 to track interrupt statistics directly instead of relying on the operating system to track the interrupt statistics. As yet another example, interrupt daemon 140 can have multiple threads, with one thread per processor, and each thread is responsible for maintaining the interrupt statistics for the corresponding processor.

The interrupt load for an interrupt can be provided in the form of a percentage of the processor's total processing capacity that is currently being used by the interrupt. When interrupt load monitor 142 gathers information about the individual interrupt loads for a processor, interrupt load monitor 142 can aggregate the individual interrupt loads to determine the total interrupt load for the processor.

After the total interrupt load for each processor is determined, heuristic generator 144 can calculate the average total interrupt load per processor by aggregating all of the individual total interrupt loads for the processors and then dividing by the total number of processors for which the individual total processor loads were aggregated.

The average total interrupt load per processor can be viewed as representing the ideal balancing of interrupts for the system. If each processor were exactly at the average total interrupt load, there would be no need to redistribute interrupt loads between processors. However, because one interrupt is processed by one processor, instead of the an interrupt being processed together by two or more processors, the interrupts can be described as atomic objects, which will vary in size based on how much processing is required for the particular interrupt. Thus, the average total interrupt load per processor in practice represents the goal to strive for, although the goal will seldom, if ever, be attained.

Note that in other implementations, other approaches for determining the average total interrupt load per processor can be used, such as by determining the average based on the total number of processors, including both interrupt eligible and interrupt ineligible processors, or by using just the total number of interrupt eligible processors that have at least some interrupt load, thereby ignoring interrupt eligible processors that currently have no interrupt load.

2.2 Determining a Heuristic for Each Processor

In block 320, a processor is selected for which to determine a heuristic value. For example, from a listing of the interrupt eligible processors, the first listed processor or the processor with the lowest or highest processor identifier can be selected. Once a heuristic value for a processor is determined, the processor can be removed from the list or an indicator can be changed to indicate that the processor has had the heuristic value determined to avoid that processor from having the heuristic value determined again in a subsequent pass through block 320. Thus, block 320 is the beginning of a loop from block 320 through block 370 that is exited once all the interrupt eligible processors have had a heuristic value determined.

2.2.1 Processor Load Less Average Load

In block 330, the selected processor's total interrupt load minus the average total interrupt load per processor is calculated, but not less than zero. The difference between a processor's total load and the average load provides one type of indication or measurement of how far the selected processor's total interrupt load is from the goal of being at the average total interrupt load per processor.

If the processor's total interrupt load is less than the average, the result is a negative value, which can be set equal to 0 based on the heuristic value scale of 0 to 1. Since the theoretical goal is to have all processors at exactly the average total interrupt load per processor, the main concern is in identifying those processors that are above the goal (e.g., processors with total interrupt loads above the average total interrupt load per processor). Therefore, for any processor that is better than that goal (e.g., processors whose total interrupt load is less than the average), the heuristic is set equal to 0, thereby indicating that such a processor does not need to have any of the interrupts moved to achieve a better balance. In fact, a processor with a heuristic of 0 is generally a good candidate for taking on additional interrupts to help balance out other processors whose total interrupt load is above the average total interrupt load per processor.

As a specific numerical example, assume that the average total interrupt load per processor is 25%. If processor 110$a$ has a total interrupt load of 30%, the heuristic value is then calculated as 30%–25%=0.05, which means that processor 110$a$ has a total interrupt load that is 5% above the average total interrupt load. The extra 5% load that processor 110$a$ is above the average total interrupt load per processor represents the largest improvement that could be obtained by moving 5% of processor 110$a$'s load to another processor that is below the average total interrupt load per processor.

As another specific numerical example, if processor 110$b$ has a total interrupt load of 20%, the heuristic is then 20%–30%=–0.10, which means that processor 110$b$ has a total interrupt load that is 10% less than the average total interrupt load. In this case, because the heuristic is less than 0, the result for processor 110$b$ is set equal to 0, thereby indicating processor 110$b$ has a total interrupt load that is at least as good as the ideal goal of being at the average total interrupt load per processor.

2.2.2 Processor Load Less Largest Individual Load

In block 340, the selected processor's total interrupt load minus the largest individual interrupt load on the selected processor is calculated. The difference between a processor's total load and the largest individual load is another indication or measure of how far the selected processor's total interrupt load is from the goal that takes into account the fact that the largest interrupt load must be on one processor, so there is typically no benefit in trying to move the largest interrupt load from one processor to another processor. In fact, such an effort is generally a waste of system resources in making such a change, plus the overall system's performance can be reduced due to impact on the warm caches of the processors. Thus, the best improvement that could be obtained in rebalancing interrupt loads is that all of the other interrupt loads could potentially be moved, but just not the largest interrupt load. This type of heuristic can be very informative in situations in which a processor has one very large interrupt load that largely or completely dominates the processor, and perhaps one or more other smaller interrupt loads that would therefore be good candidates to consider reassigning to other processors.

As a specific numerical example, assume that processor 110$c$ has a total interrupt load of 95%, which includes the following three individual interrupt loads: 60%, 25%, and 10%. Processor 110$c$'s total interrupt load less the largest individual interrupt load is then 95%–60%=0.35. Therefore, the biggest improvement that could be obtained would be to move the 25% and 10% interrupt loads off of processor 110$c$ to another processor that has a total interrupt load that is less than the average total interrupt load per processor. The largest individual interrupt load of 60% remains on processor 110$c$, since that interrupt load must be on one of the processors and there is no reason to try to move that 60% interrupt load to another processor. Note that this is a different result than applying the first type of heuristic above, for which the heuristic would be calculated as processor 110$c$'s total interrupt load less the average total interrupt load per processor of 30%, which would be 95%–30%=0.65.

As another specific numerical example, assume that processor 110$c$ instead has a total interrupt load of 95%, which includes 19 individual interrupt loads of 5% each. In this example, processor 110$c$'s total interrupt load less the largest individual interrupt load is then 95%–5%=0.90. Therefore, the biggest improvement that could be obtained would be to move all but one of the 5% interrupt loads to other processors, although in practice once processor 110c's interrupt load is at the average total interrupt load per processor, which is the ideal goal, no further moving of interrupts would be warranted. Thus, if the average total interrupt load were 35%, at most 12 of the 5% interrupt loads (e.g., 12×5%=60%, leaving 7×5%=35% on processor 110c) would be moved. Note that this again is a different result than applying the first type of heuristic above, for which the heuristic would be calculated as processor 110c's total interrupt load less the average total interrupt load per processor of 30%, which would be 95%-30%=0.65.

As yet another specific example, if processor 110c has only one interrupt load of 85%, then the result of the second type of heuristic is 0 (e.g., total load−largest load=85%−85%=0). Therefore, in the event that a processor has a large interrupt load, but that the load is from only one individual interrupt, the heuristic value of 0 indicates that this is the best result. This result is consistent with the fact that the individual 85% interrupt load must be on a processor, so that there is no improvement that can be achieved in the balance of interrupts across the processors by trying to move that large interrupt to another processor. In fact, the effort of trying to move such a large individual interrupt would consume processing resources without improving the overall balance of the interrupts among the processors. Thus, the resulting heuristic value of 0 in this situation would help ensure that the processor with such a large individual interrupt load would not be considered in subsequent efforts to reduce the interrupt load on the processor.

2.2.3 Selecting the Minimum Measurement

In block 350, the minimum result from blocks 330 and 340 is selected as the heuristic value for the processor. As illustrated in the specific numerical examples above, the results of the two different heuristics can provide different indications of how imbalanced a processor is when compared to the other processors. Therefore, if both of these types of heuristics are used, namely (a) the total interrupt load for the processor less the average total interrupt load per processor from block 330 and (b) the total interrupt load for the processor less the largest individual load for the processor from block 340, the heuristic for the processor can be taken as the smaller of these two different types of heuristics. By taking the minimum value, the final heuristic for the processor is based on the most limited improvement based on the two different approaches.

For example, in the first example above for processor 110c with the interrupt loads of 60%, 25%, and 10% and the average total interrupt load per processor of 30%, processor 110c's total interrupt load less the average total interrupt load per processor of 30% results in a heuristic value of 0.65. However, the heuristic based on processor 110c's total interrupt load less the largest individual interrupt load gives a heuristic value of 0.35. Thus, the second heuristic provides the minimum heuristic value of 0.35, which reflects that even though processor 110c is far above the average total interrupt load per processor as indicated by the first type of heuristic, the large individual 60% interrupt limits how much the interrupt load for processor 110c can be rebalanced among other processors.

In contrast, in the second example above for processor 110c with the 19 interrupt loads of 5% each, the first heuristic based on the average total interrupt load per processor results in a heuristic value of 0.65, while the second heuristic based on ignoring the largest individual interrupt load on the processor results in a heuristic value of 0.90. In this example, the lack of a large individual interrupt load on processor 110c does not prevent the potential of reducing the total interrupt load on processor 110c to the average total interrupt load, as indicated by the result of the first heuristic that provides the minimum value when compared to the second heuristic.

Finally, in the third example above in which processor 110c has a single 85% load, the result of the first heuristic based on the average total interrupt load per processor gives a result of 0.55, while the second heuristic based on ignoring the largest individual interrupt load gives a result of 0. In this example, the minimum value is based on the second heuristic and is in fact the best heuristic value of 0, thereby indicating that from a balancing standpoint, having a single 85% interrupt load on processor 110c is perfectly fine because that large individual interrupt load has to be somewhere. Thus, the balance of interrupts for the system cannot be improved by moving the large individual interrupt load to another processor, which is reflected in the final heuristic value of 0.

2.2.4 Pathological Situations

In block 360, if the total interrupt load for the processor is above a threshold value and there are two or more interrupt loads on the processor, the heuristic value is set equal to 1. For example, the threshold can be set at 85%, so that if the processor's total load is greater than 85% and arises from at least two interrupts, the criteria is satisfied and therefore the heuristic value for the processor is 1, the worst possible value.

This type of heuristic determination is used for special situations in which the heuristic values determined above in blocks 330, 340, and 350 may indicate an imbalance that would not trigger an attempt to redistribute the interrupts, yet there can still be a desirable benefit to potentially be realized by reassigning interrupts. Specifically, when one or more pathological situations occur, it can be beneficial to emphasize such pathological situations by setting the heuristic value equal to a large value, such as the worst possible value of 1, thereby helping to increase the likelihood of a reassignment or to even ensure that a reassignment is attempted to rebalance the interrupts.

As a specific example, if a processor has a total interrupt load of 100%, with one interrupt having a 100% interrupt load for one interrupt and another interrupt having a 0% load, the larger interrupt load is starving the smaller load. This can arise if the priority of the larger interrupt load is higher than that of the smaller interrupt load. This type of situation can be particularly troublesome in a situation in which the larger load is from a network controller while the smaller load is from one disk drive out of many disk drives in a single file system that is treated as a single device within the system. If the interrupt from the disk drive cannot be processed, the operation of the entire file system is stopped because the interrupt cannot be processed.

The heuristic value that results from using the minimum of the two different heuristics above would be a heuristic value of 0 (e.g., 100%-100%=0 from the second heuristic, which would be the smallest possible value, and therefore the selected minimum in block 350). The heuristic value of 0 is the best heuristic value of 0 because there is no rebalancing that can be performed for that processor since there is no benefit in moving the 100% interrupt load since that large interrupt load must be somewhere. However, if the smaller interrupt load is being starved of processing resources by the larger load, there can still be a benefit to the system by moving the smaller interrupt load to another less loaded processor on which the smaller interrupt would be able to receiving processing. Therefore, by making a check for such a pathological situation and setting the heuristic value to a specified value instead of the calculated heuristic from blocks 330, 340, and 350, those pathological situations can be emphasized and addressed by either increasing the likelihood of a rebalancing attempt or ensuring that such an attempt is made.

In block 370, a check is made as to whether the processor selected in block 320 is the last processor. If not, there are more processors for which a heuristic value needs to be generated, and the process returns to block 320 to select another processor. However, if the selected processor is the last processor, the process continues to block 380.

2.3 Determining a Heuristic for the System

In block 380, the largest individual processor heuristic value is selected as the heuristic value for the system. For example, if the heuristic values for processors 110a, 110b, 110c are 0.35, 0.10, and 0, the heuristic value for the system is 0.35. By selecting the largest individual processor heuristic value as the heuristic value for the system, the approach emphasizes the worst processor, even if on average, most of the remaining processors are relatively well balanced. Because even one severely imbalanced processor can significantly impact the system (e.g., such as when a large network controller interrupt is starving a disk drive interrupt on the same processor), making an attempt to rebalance the interrupts can still be very desirable.

However, in other implementations, a different approach for determining the heuristic value for the system can be used. For example, the heuristic value can be calculated as the average of the individual processor heuristic values, the average of the largest 10% of the individual processor heuristic values, or through another suitable approach. In these examples, less emphasis is placed on the worst processor and more is placed on the overall system performance, which can be beneficial if pathological situations are less of a concern and there is a desire to minimize the detection of interrupt imbalances, although other means for achieving that goal are described further herein as well.

Finally, although not depicted in FIG. 3, another check can be made to determine if an individual processor heuristic is above a threshold, and if so, the process proceeds from block 370 to block 380 without looping back to block 320 to determine the heuristic values for any remaining processors. This check can be useful when the system heuristic value is being determined as the maximum value from among the individual processor heuristic values. As a result, if a particular individual heuristic value is determined to be sufficiently large that it would most likely trigger an attempt to reassign interrupts, there is no benefit to be gained by determining additional individual processor heuristic values.

As a specific example, if an individual heuristic value is at the largest possible value, such as 1 for a heuristic value scale of 0 to 1, there is no need to determine heuristic values for the other processors if the system heuristic is based on the highest individual processor heuristic, which would be 1 in this specific example.

3.0 Triggering a Reassignment of Interrupts

The purpose of determining a system heuristic is to be able to decide when a reassignment of interrupts should be triggered based on an assessment of the imbalance of interrupts in the system. If the system heuristic indicates that the interrupt imbalance is sufficiently bad, an attempt to reassign interrupts among the processors in the system is triggered. However, if the system heuristic indicates that although there is an interrupt imbalance, the imbalance is not sufficiently large to warrant the efforts involve in attempting to reassign the interrupts, then the attempt to reassign the interrupts is not made. The following describe how to determine when the imbalance of interrupts is bad enough to trigger an attempt to reassign interrupts among the processors.

3.1 Establishing a Baseline for Comparison

In order to determine if the interrupt imbalance is bad enough to trigger reassigning the interrupts, a comparison is made of the interrupt imbalance of the system to one or more criteria. For example, the system heuristic as determined above using the approach of FIG. 3 can be compared to a specified value that is established by a user. However, because interrupt loads are variable and change over time, both due to short term fluctuations that are fairly random and longer term fluctuations that are due to the demands being placed on the system, comparing the system heuristic to a specified value may not be as useful as comparing the system heuristic to a baseline that can change over time.

For example, as discussed above with respect to block 214 of FIG. 2, a baseline heuristic can be determined shortly after startup of the system as well as anytime that an attempt is made to reassign interrupts. The baseline heuristic can be determined using the approach of FIG. 3, just as the system heuristic value is determined using that same approach. In fact, by using the same process to determine both the baseline heuristic value and the system heuristic value, there is consistency between the two values, which can preclude problems that might arise if the two values were determined in different ways. However, in other implementations, the determination of the baseline heuristic and the system heuristics can differ.

Also note that due to the fluctuations in the determination of a system heuristic value, the baseline heuristic value can be determined based on two or more separate system heuristic values, such as the time-based average system heuristic described in the following subsection. As a result, the baseline heuristic is more likely to be representative of the system's interrupt balance than would otherwise be the case when using a single point in time to determine the baseline heuristic value.

3.2 Time-Based Average System Heuristic

As noted above, the interrupt loads on the processors change over time and can exhibit both short term and longer term fluctuations. Thus, it is possible that when a system heuristic value is calculated at a particular time, the result may be atypically low or high as compared with what the system heuristic value would be at most other times. Therefore, instead of comparing an individual system heuristic value to the baseline heuristic value, a time-averaged system heuristic value can be compared to the baseline heuristic value. Similarly, the baseline heuristic value can also be a time-averaged heuristic value based on two or more separate system heuristic determinations.

For example, the individual system heuristic values determined over a specified time period can be used to determine a composite system heuristic value that is then compared to the baseline heuristic value. As a more specific example, if a system heuristic value is being generated every 10 seconds, then the system heuristic values for the last minute, or 60 seconds, can be averaged to determine a composite system heuristic value that is then compared to the baseline heuristic value. As another example, a specified number of previous system heuristic values, such as the last 5 system heuristic values, can be averaged. As yet other examples, different system heuristic values can be weighted more than others as part of determining a weighted average, such as by more heavily weighting more recent system heuristic values than less recent system heuristic values.

3.3 Use of a Margin for Triggering a Reassignment

In addition to using a baseline heuristic for comparing time-averaged system heuristics, some implementations also incorporate a margin value in determining whether the interrupt imbalance is sufficiently bad to trigger an attempt to reassign interrupts among the processors. For example, if no margin were used and the time-averaged system heuristic value were compared to the baseline heuristic value, a reassignment would be triggered whenever the former was larger than the latter, even if the different were only a very small amount. However, in such a situation, there would likely be little room to improve the system heuristic relative to the baseline, so a significant amount of system resources may be expended in reassigning interrupts that is not warranted for the small potential to improve the overall interrupt balance for the system.

As a specific example, assume that the baseline heuristic is 0.35 and that the time-averaged system heuristic is 0.40. While theoretically the time-averaged system heuristic could be reduced from 0.40 to 0, the baseline heuristic of 0.35 indicates how good of an interrupt imbalance could reasonably be achieved at a previous time, and thus comparing the time-average system heuristic to the baseline heuristic represents an appropriate comparison to determine whether a sufficient interrupt imbalance exists to warrant a reevaluation of the interrupt loads. While simply comparing the baseline to the system heuristic would indicate an imbalance that could trigger a reassignment, the similarity of time-averaged system heuristic of 0.40 to the baseline heuristic of 0.35 indicates that the interrupts loads that existed when the baseline heuristic were determined are similar to the interrupts loads that result in the time-average system heuristic. However, as the interrupt loads change from when the baseline heuristic was determined, the time-averaged system heuristic increases, thereby indicating that a reevaluation of the interrupt loads is warranted because the interrupt loads no longer resemble the interrupt loads when the baseline heuristic was determined. Thus, a margin value can be used as a measure of the degree to which the interrupt loads have changed to warrant making a reevaluation of the interrupt loads.

For example, if a margin of 0.10 were used, then the system heuristic would need to be at least 0.10 greater than the baseline heuristic to trigger a reassignment of interrupts. For example, a time-averaged system heuristic of 0.40 would not trigger a reassignment with a baseline heuristic of 0.35 and a margin of 0.1 (e.g., 0.40<0.35+0.1). However, a time-averaged system heuristic of 0.47 would trigger a reassignment (e.g., 0.47>0.35+0.10).

The use of a margin value in determining when a reassignment is triggered allows for adjusting the frequency of reassignments, so that for a particular implementation, a suitable margin value can be selected that triggers reassignments frequently enough to so that the interrupts are not too imbalanced, yet not so frequent that the reassignment process itself results in too large of a negative impact on the system's performance.

The value of the margin can be specified to be a particular value within the coding of the interrupt daemon itself, by a user or system administrator through a configurable parameter, or by the interrupt daemon itself based on past performance. As a specific example of the last option, the interrupt daemon can include one or more parameters to judge how frequently the reassignment process is triggered, and if that frequency is too big or too small, the interrupt daemon can make a corresponding change to the margin, within a specified range, to decrease or increase the frequency of triggering a reassignment, as described more fully below.

3.4 Setting a Measurement Interval

Although the balance of interrupts among the processors changes over time, in most applications, the interrupt balance need not be monitored in a continuous manner. Rather, the system heuristic can be determined at periodic intervals, between which the interrupt daemon goes to sleep until the interval has passed. Upon expiration of the sleep interval, the interrupt daemon awakens to take another measurement of the interrupt imbalance.

As one example, the interrupt daemon can be configured to sleep for a specified period of time, such as 10 seconds. Then after each interrupt imbalance measurement, the interrupt daemon sleeps for that specified period before awakening to make another measurement.

As another example, the interrupt daemon can be configured to make interrupt imbalance measurements at periodic intervals based on a clock time. Specifically, the interrupt daemon can be configured to make imbalance measurements at the start of each minutes and every quarter minute thereafter. As a result, upon completion of a measurement, the interrupt daemon checks the current time on the clock to determine how long the interrupt daemon should sleep so that the interrupt daemon awakens at the next quarter minute time. Other approaches for determining the frequency of interrupt imbalance measures are described below in Section 7.1.

4.0 Generating a New Mapping of Interrupts to Processors

Once a reassignment of interrupts is triggered, a new mapping of interrupts to processors is generated. Note that the interrupts themselves are not being reassigned as part of generating the new mapping. Rather, the new mapping is generated while the system continues to distribute interrupts among the processors based on the original mapping in effect at the time that the reassignment process is triggered. After the new mapping is generated, the new mapping may or may not be used to update mapping 124 used by central hub 120 to distribute the interrupts to the processors, as described further herein.

4.1 Maintaining Consistency with Imbalance Detection

One consideration in generating the new mapping is that the approach used to create the new mapping should be consistent with the approach used to detect the interrupt imbalance that triggered the reassignment. For example, the heuristics for the individual processors are determined based on the total interrupt load of a processor as compared to either the average total interrupt load per processor or the largest individual interrupt load on the processor. Those same consideration should be reflected in the approach for generating the new mapping to avoid a situation in which new mappings are created that are not viewed by the imbalance detection approach as improving the system. Otherwise, the new mappings may be viewed by the imbalance detection approach as either not improving the system heuristic or perhaps even as making the system heuristic worse, which would likely trigger another reassignment, and so on. Therefore, as described further herein, in one embodiment, the generation of a new mapping of interrupts to processors reflects the same considerations as are used in detecting an interrupt imbalance.

Figure 4:
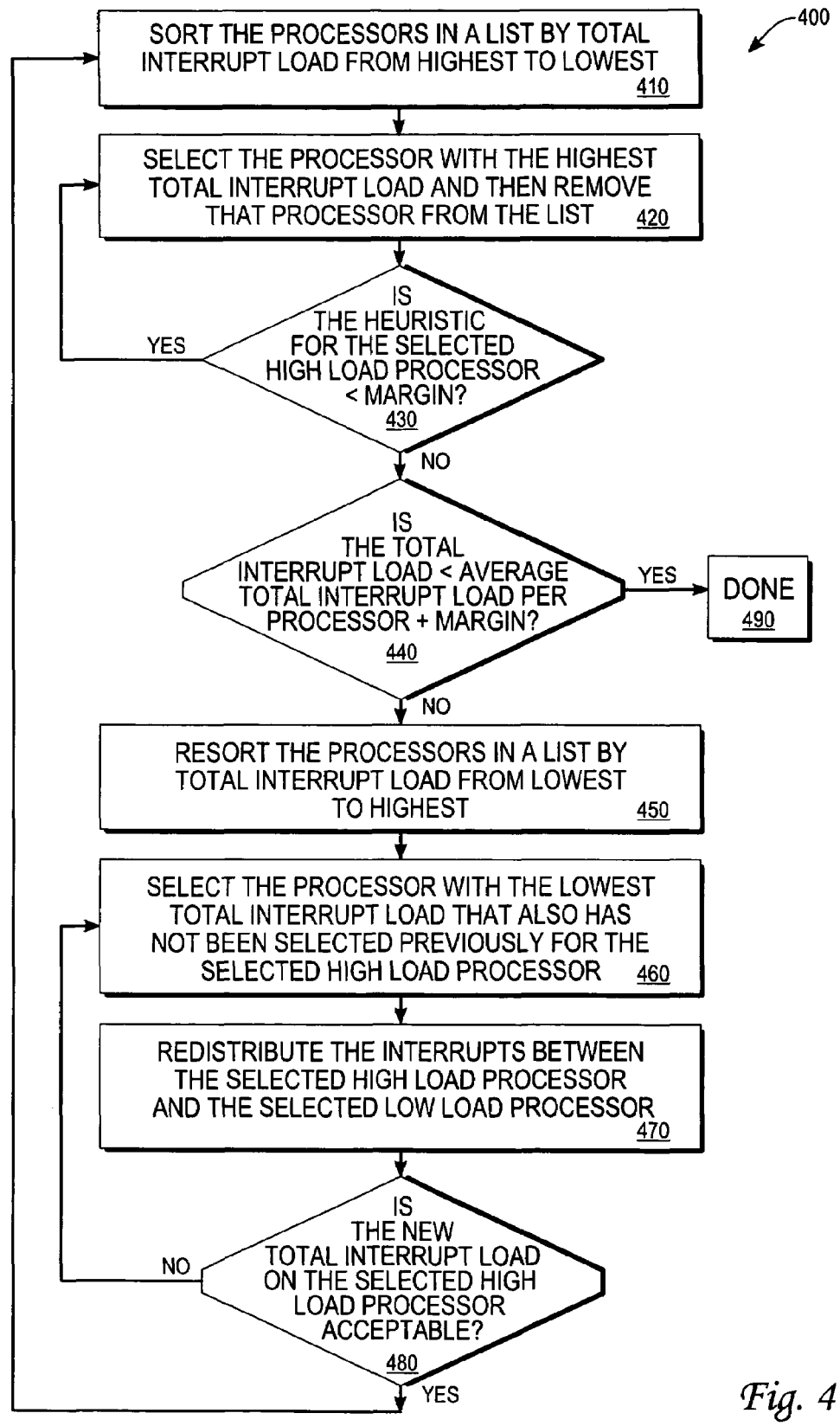
FIG. 4 is a block diagram that depicts an approach for generating a new mapping of interrupts to processors, according to an embodiment.

FIG. 4 is a block diagram 400 that depicts an approach for generating a new mapping of interrupts to processors, according to an embodiment. The approach of FIG. 4 can be implemented by mapping generator 146 of interrupt daemon 140. In the particular example of FIG. 4, interrupts are redistributed between processors in a pair-wise manner. In other words, processors are selected two at a time for redistributing the interrupts between the pair of processors, following the completion of which another pair of processors are selected and the interrupt load between the selected pair redistributed, and so on. By redistributing interrupts between pairs of processors, as compared to redistributing all loads between all processors at the same time, the system resources required for the redistribution process can be minimized while still allowing for an optimized redistribution of interrupts between each pair of processors.

4.2 Sorting Processors by Interrupt Load

In block 410, the processors are sorted in a list by total interrupt load from highest to lowest. For example, interrupt daemon 140 generates a list of the interrupt eligible processors in the system based on the interrupt load data received from the processors when generating the last system heuristic. As a specific example, if processor 110*a* has a total interrupt load of 35%, processor 110*b* has a total interrupt load of 45%, and processor 110*c* a total interrupt load of 15%, then processor 110*b* is at the top of the list, followed by processor 110*a*, and then processor 110*c*.

Sorting the list of interrupt eligible processors from highest to lowest facilitates identification of the processor with the highest interrupt load. However, in other implementations, other techniques for identifying the processor with the highest interrupt load can be used than a sorted list. For example, a search can be made of an unsorted list to identify the processor with the highest total interrupt load.

4.3 Selecting the High Load Processor

In block 420, the processor with the highest total interrupt load is selected, and then the selected high load processor is removed from the sorted list created in block 410. For example, in the sorted list for processors 110*a*, 110*b*, 110*c* described above, processor 110*b* is the highest load processor, and therefore processor 110*b* is selected. Then processor 110*b* is removed from the sorted list, leaving processor 110*a* and processor 110*c*.

In block 430, a determination is made whether the heuristic for the selected high load processor is less than the margin. If so, the process returns back to block 420, and if not, the process continues on to block 440. In the case that the selected high load processor has a heuristic value of less than the margin, then selected high load processor has little room for improvement even though the total interrupt load on that processor is high. For example, the processor may have a single interrupt load of 95%, and therefore the resulting heuristic is 0 based on the approach of FIG. 3 above. Such a high load processor is skipped in the reassignment process. However, if the heuristic value for the selected high load processor is greater than the margin, then the process continues, since for such a processor the heuristic indicates that there is the potential to reduce the high load processor's total interrupt load by at least an amount corresponding to the margin.

As a specific example, if the heuristic value for processor 110*b* is 0.5 and the margin is 0.1, the process continues on to block 440. However, if the heuristic value for processor 110*b* is 0 and the margin is 0.1, then processor 110*b* is skipped and the process returns to block 420. Note that this is an example of making the reassignment approach consistent with the imbalance detection approach since both rely on the use of the same margin as an indication of how much of a deviation is needed to make taking an action worthwhile.

Note that in other implementations, such a comparison of the heuristic value of the selected high load processor to the margin need not be made, which would mean that all of the selected high load processors would be considered for redistributing interrupts. Also, while in these examples the same margin is used in the determination of block 430 as in the detection of the imbalance and triggering the reassignment, a different margin value between the two can be used in other implementations.

In block 440, a determination is made whether the total interrupt load for the selected high load processor is less than the sum of the average total interrupt load per processor plus the margin. If so, the process continues to block 490, which indicates that the reassignment process is done. In this situation, the selected high load processor is close enough to the goal of the average total interrupt load per processor that the reassignment process is complete. Note that all the other processors in the sorted list have even smaller total interrupt loads than the selected high load processor identified in block 440 as having a total interrupt load within the margin of the average total interrupt load per processor, so by ending the process at this point, there are no other processors that would not similarly have a total interrupt load within the margin of the average.

However, if in block 440 the total interrupt load for the selected high load processor is higher than the average total interrupt load per processor plus the margin, the selected high load processor can potentially improve to have a total interrupt load within the margin of the average, and the process continues on to block 450.

4.4 Selecting the Low Load Processor

In block 450, the processors are resorted in a list by total interrupt load from lowest to highest. For example, interrupt daemon 140 resorts the list of processors that was left after removing the selected high load processor in block 420. As a specific example, the list resulting from block 420 has processor 110*a* and then processor 110*c*, and now the list is resorted and has processor 110*c* that has a total interrupt load of 15% listed at the top followed by processor 110*a* that has a total interrupt load of 35%.

Sorting the list of interrupt eligible processors from lowest to highest facilitates identification of the processor with the lowest interrupt load. The resort can be efficiently performed based on the current sorted list of processors from highest to lowest by merely inverting the list. However, in other implementations, other techniques for identifying the processor with the lowest interrupt load can be used than a sorted list. For example, a search can be made of an unsorted list to identify the processor with the lowest total interrupt load.

In block 460, the processor with the lowest total interrupt load is selected, provided that the selected low load processor has not been previously selected for the selected high load processor. Note that multiple passes through block 460 may occur for the same high load processor, depending on the results of redistributing the interrupt loads between the selected high load and low load processors, as determined in block 480.

For example, in the resorted list having processor 110*c* listed first followed by processor 110*a*, processor 110*c* is selected as the low load processor.

4.5 Redistributing Interrupts Among the High and Low Load Processors

In block 470, the interrupts between the selected high load processor and the selected low load processor are redistributed. For example, the individual interrupts from both the high load and low load processors can be combined into a list and sorted from highest interrupt load to lowest interrupt load. By applying an optimization technique, such as a depth first search or a breadth first search, an optimized distribution of the interrupts between the two processors can be determined. The redistribution of interrupt loads according to a depth first search is described in detail below.

In determining the optimal redistribution of the interrupt loads between the selected high load processor and the selected low load processor, one or more rules can be applied, such as the following: (1) after redistribution, the high load processor should remain the high load processor; (2) after redistribution, the high load processor's load should be reduced so as approach the average total interrupt load per processor as closely as possible, and (3) if the highest interrupt load between the two processors is already on the high load processor, that highest interrupt load remains on the high load processor.

The first rule helps to ensure that the reassignment process does not result in a situation in which interrupts are repeatedly reassigned between processors while trying to achieve the goal represented by the second rule. Since the purpose of reassigning interrupts between processors is to obtain a more even interrupt load distribution that is closer to the goal of the average total interrupt load per processor, ideally the high load processor's load decreases and the low load processor's load increases to both be closer to the average that is the goal. However, if the interrupts were redistributed such that the low load processor has a higher load than the high load processor, a situation could arise in which interrupts are moved back and forth between processors, without an overall improvement in the interrupt balance for the system.

For example, assume that the high load processor has a total interrupt load of 48% that includes a 38% load and a 10% load, while the low load processor has a total interrupt load of 30% that includes just one 30% load. If the average total interrupt load per processor is 35%, moving the 10% load from the high load processor to the low load processor leaves the high load processor with a load of 38%, which is very close but still above to the goal of 35%, as desired. However, the low load processor now has a total interrupt load of 40%, which is now greater than the new load for the high load processor. As a result, such a redistribution of the 10% load would not be used because the first rule is not satisfied.

The third rule reflects the heuristic that is based on the total interrupt load for a processor less the largest individual interrupt load. Since the largest individual load has to be on a processor, and if the largest individual load is already on the high load processor, there is no reason to try to move that highest individual interrupt load to another processor. And as with the first rule, if the highest load interrupt were moved from the high load processor to the low load processor, it could be impossible to satisfy the first rule of having the high load processor remain the high load processor after the redistribution of interrupts. Thus, the highest interrupt load, if already on the high load processor, remains on the high load processor, and the remaining interrupts between the high load processor and the low load processor are redistributed to attempt to improve the overall interrupt imbalance. This is another example of making the reassignment approach consistent with the interrupt imbalance measurement and detection approach because both take into account keeping the highest individual interrupt load on the high load processor, reflecting the fact that such a highest individual interrupt load is not an imbalance since that interrupt load must be located on a processor.

4.6 Determining if the Redistribution of Interrupts is Acceptable

In block 480, a determination is made as to whether the new total interrupt load on the selected high load processor is acceptable. For example, the goal of redistributing the interrupts between the selected high load processor and the selected low load processor can be that a new heuristic value based on the new total interrupt load on the high load processor is less than the average total interrupt load per processor plus the margin. Therefore, if the redistribution of interrupt loads is later incorporated into a new mapping of interrupt loads among the processors, the high load processor will have a new heuristic value that would not trigger another attempt to reassign the interrupts.

In other implementations, other criteria for determining whether the new total interrupt load on the selected high load processor is acceptable. For example, instead of using the same margin value as in the interrupt imbalance detection approach, a different margin value can be used, which may be either less than or greater than the margin value for detecting an interrupt imbalance. Because the baseline may be reset after a reassignment, using a different margin for determining the acceptability of the new total interrupt load for the selected high load processor may not be likely to trigger another attempt to reassign interrupt loads among the processors.

As another example, in block 480, the new total interrupt load for the selected high load processor can be compared to the baseline heuristic, and the if the difference is less than a specified amount, such as 10%, the new total interrupt load for the selected high load processor is deemed to be acceptable.

If in block 480, the new total interrupt load on the selected high load processor is acceptable, the process returns to block 410, where the processors are again sorted in a list by total interrupt load from highest to lowest. Thus, the approach of FIG. 4 begins again, but for another high load processor. Recall that in block 420, the previously selected high load processor is removed from the list, so that when the processors are resorted when passing back trough block 410 again, a different processor will be at the top of the sorted list.

If in block 480, the new total interrupt load on the selected high load processor is not acceptable, the process returns to block 460 so that another low load processor can be selected. In this situation, the interrupt loads between the selected high load processor and the previously selected low load processor may not have allowed for an acceptable new total interrupt load for the selected high load processor to be obtained, in which case another attempt is made using another low load processor.

Typically, a low load processor is selected that allows for the new total interrupt load for the selected high load processor to be acceptable. However, in the event that all of the low load processors are exhausted without obtaining an acceptable new total interrupt load for the selected high load processor, then the process returns to block 410 (although this path is not depicted in FIG. 4). Alternatively, the best result for the new total interrupt load for the selected high load processor can be tracked, and if no low load processor is found that provides for an acceptable result in block 480, the best result can be used.

Note that unlike the high load processors that are removed from the list of processors in block 420 when each high load processor is selected for attempting to redistribute interrupt loads, when a low load processor is selected and the interrupt loads are redistributed between the selected low load processor and the selected high load processor, the selected low load processor remains on the list. As a result, the low load processor can potentially have interrupts from multiple high load processors reassigned to the low load processor, which may occur when a particular low load processor has a very low initial total interrupt load and receives a small number of smaller interrupt loads from different high load processors as part of multiple redistribution attempts between the selected low load processor and multiple selected high load processors.

5.0 Using the New Mapping of Interrupts to Processors

The result of the approach for redistributing interrupts to processors, such as the approach depicted in FIG. 4, is a new mapping of interrupts to processors. In some implementations, the new mapping can be automatically applied by central hub 120 to update mapping 124. However, in other implementations, an assessment is made of the new mapping, and only if the new mapping is deemed acceptable is the new mapping used. Thus, it is possible that the new mapping that is generated via the approach of FIG. 4 may be discarded because the new mapping does not result in a sufficient improvement to warrant being implemented since change the mapping of interrupts to processors does consume some of the system's resources and will reduce for a time the benefit of warm caches when interrupts are reassigned to different processors.

5.1 Determining if the New Mapping is a Sufficient Improvement

According to one embodiment, a new mapping of interrupts to processors is evaluated to determine of the new mapping provides a sufficiently large improvement over the previous mapping to warrant implementing the new mapping. For example, a new system heuristic value can be determined using the approach of FIG. 3 based on the individual interrupt loads being redistributed among the processors based on the new mapping, although no actual redistribution of the interrupts is performed. Rather, the individual interrupt load data that was obtained as part of the original interrupt imbalance detection effort that triggered the generation of the new mapping is used. Specifically, the individual interrupt loads are virtually rearranged among the processors according to the new mapping, so that individual heuristic values for each processor can be determined followed by a new system heuristic value.

Once the new system heuristic value based on the new mapping is determined, the new system heuristic is compared to the current system heuristic value. For example, the new system heuristic value is compared to the difference of the current system heuristic value that trigger the reassignment and the margin value. This means that the new mapping must provide an improvement in the baseline that is at least as great as the margin. Typically, the margin used in this comparison is the same margin that is used in the interrupt imbalance detection, which is another example of keeping the reassignment process and the imbalance detection process consistent. However, in other implementations, a different margin can be used.

Also, in other implementations, different criteria can be used to evaluate the new mapping. For example, the new system heuristic can be compared to the old system heuristic, with or without a margin value, to determine of the new mapping is a sufficient improvement over the old mapping.

If the new mapping is determined to be acceptable, the new mapping is applied, as described below. However, if the new mapping is not acceptable, the previous mapping continues to be used. In either case, the baseline can be updated, as described below.

5.2 Applying the New Mapping

If the new mapping is acceptable as described above, or if some other approach is used to that results in the new mapping being used, the mapping 124 used by the central hub 120 is updated based on the new mapping. For example, interrupt daemon 140 can send the new mapping to central hub 120, which then replaces the previous mapping with the new mapping. As another example, either interrupt daemon 140 or central hub 120 can compare the previous mapping to the new mapping, identify the differences, and then change those portions of mapping 124 to reflect the differences identified thereby.

Once mapping 124 is updated based on the new mapping, any interrupts received from devices 130*a* through 130*g* at central hub 120 are distributed to processors 110*a*, 110*b*, 110*c* according to the updated mapping 124. However, any instances of the interrupts currently being handled by any of processors 110*a*, 110*b*, 110*c* prior to the updated mapping 124 being implemented continue to be handled by those processors until the processing of those instances of the interrupts is complete. Thereafter, when another instance of the same interrupt is received by central hub 120, if there is a change regarding which processor is assigned to handle the interrupt, the change takes effect upon the receipt of the new instance of the interrupt.

5.3 Updating the Baseline

In some implementations, regardless of whether or not the new mapping is applied by central hub 120, the baseline is updated. For example, if the new mapping is applied, then updating the baseline at a time shortly after the new mapping has taken effect and interrupts are being distributed to the processors based on the new mapping allows the system to have a new basis for detecting a subsequent imbalance of the interrupts.

In contrast, if the baseline is not updated after using the new mapping, the previous baseline may not be a good indicator of when the interrupts are sufficiently imbalanced to trigger a subsequent reassignment. For example, the new mapping may provide a significant improvement in the balance of interrupts across the processors of the system, such that the interrupts could become very imbalanced relative to just after the reassignment, but still not sufficiently imbalanced based on the old, previous baseline. Thus, by updating the baseline, the approaches described herein can take into account longer term changes in the interrupt loads across the system.

Similar to updating the baseline after implementing a new mapping, the baseline can also be updated even if the new mapping is not used because the new mapping failed to provide a sufficient improvement to be judged acceptable. In this situation, even though the interrupts are not reassigned, updating the baseline can be useful to avoid triggering another reassignment in a very short time based on a similar imbalance measurement that may be very similar to the previous measurement that triggered the reassignment attempt. By updating the baseline even though a new mapping is not used, the system can self-adjust for conditions under which there is little benefit in trying to reassign the interrupts.

6.0 Optimizing the Redistribution of Interrupts

The interrupts for the system can be redistributed among the interrupt eligible processors in any of a number of ways. The following section describes one particular optimization technique called depth first search, along with a brief description of a related technique called breadth first search. However, other optimization approaches besides those described herein can be used.

With either a depth first search or a breadth first search, a tree-like structure is used to evaluate all possible permutations of redistributing the interrupts between a pair of processors. With a depth first search, the tree is traversed from top to bottom, one branch at a time. Thus, the depth first search starts at the top of the tree and works to the bottom for the first branch, and then the depth first search works through branches from left to right, until the entire tree is traversed. In contrast to a depth first search, a breadth first search works from top to bottom of the tree in layers, so that at each layer in the tree, all permutations are considered before moving down to the next layer.

Also, the depth first search technique is described below in the context of redistributing interrupts between a pair of processors, such as the selected high load processor and the selected low load processor described above with reference to the approach of FIG. 4. But in other implementations, the interrupts from among more than two processors, or even from among all interrupt eligible processors, can be redistributed in a similar fashion.

In some of implementations involving redistribution of interrupts between more than two processors at a time, the number of permutations to consider in redistributing the interrupts may be sufficiently large that the extra processing resources required to perform the optimization is not worthwhile for the benefit obtained. While using the depth first search technique based on pairs of processors provides a sufficient benefit for the amount of processing resources required in performing the optimization, the number of processors that can be effectively accommodated in a particular optimization calculation may be more than the two processors at a time described below. Therefore, the following techniques are not limited to just redistributing interrupts among pairs of processors at a time.

6.1 Depth First Search without Pruning

The depth first search technique is typically described with reference to a tree that is used to organize the different possible permutations of interrupt loads being distributed between a high load processor and a low load processor. The tree represents the interrupts being assigned to the high load processor. Therefore, for a given result from the tree for the high load processor, the interrupts not assigned to the high load processor are assigned to the low load processor. However, while a tree-based formulation is used in the following examples, other types of hierarchies can be used in other implementations to organize the evaluation of the different possible permutations.

For a simple tree that is based on a small number of interrupt loads, the number of permutations may not be large, so that all possible permutations can be explicitly determined and evaluated. However, in practice, there are a sufficient number of interrupts and therefore a sufficient number of permutations that explicitly evaluating every possible permutation may be computationally prohibitive in practice. As a result, "pruning" techniques can be used to avoid considering permutations that can be determined beforehand to not be worthwhile candidates. By applying one or more pruning rules that are suitable for the particular application, the number of permutations that must be explicitly considered and evaluated can be significantly reduced, thereby increasing the efficiently of the optimization calculation.

Figure 5A:
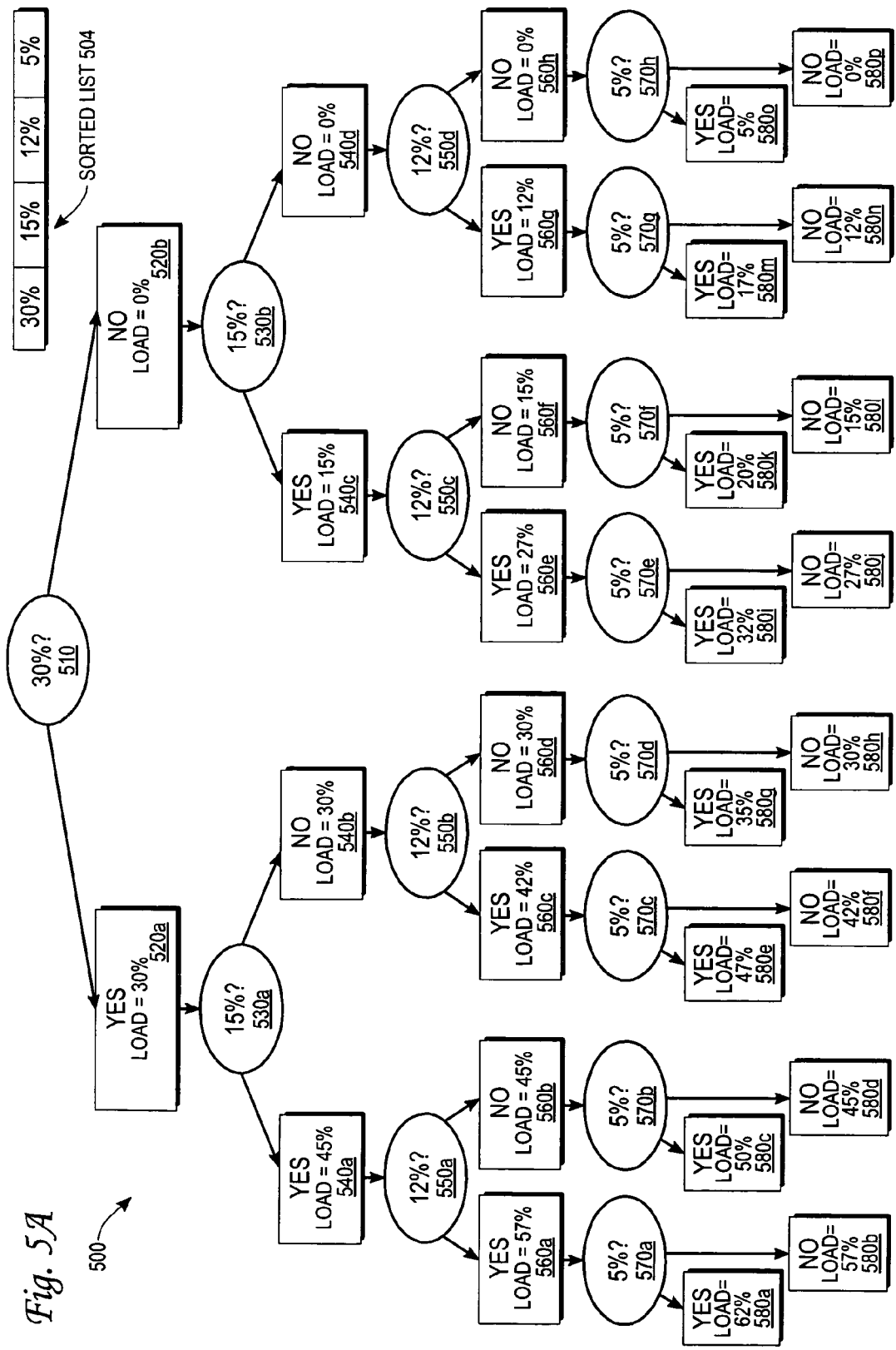
FIG. 5A is a block diagram that depicts a depth first search tree without pruning for use in redistributing interrupt loads between two processors, according to an embodiment.
Figure 5B:
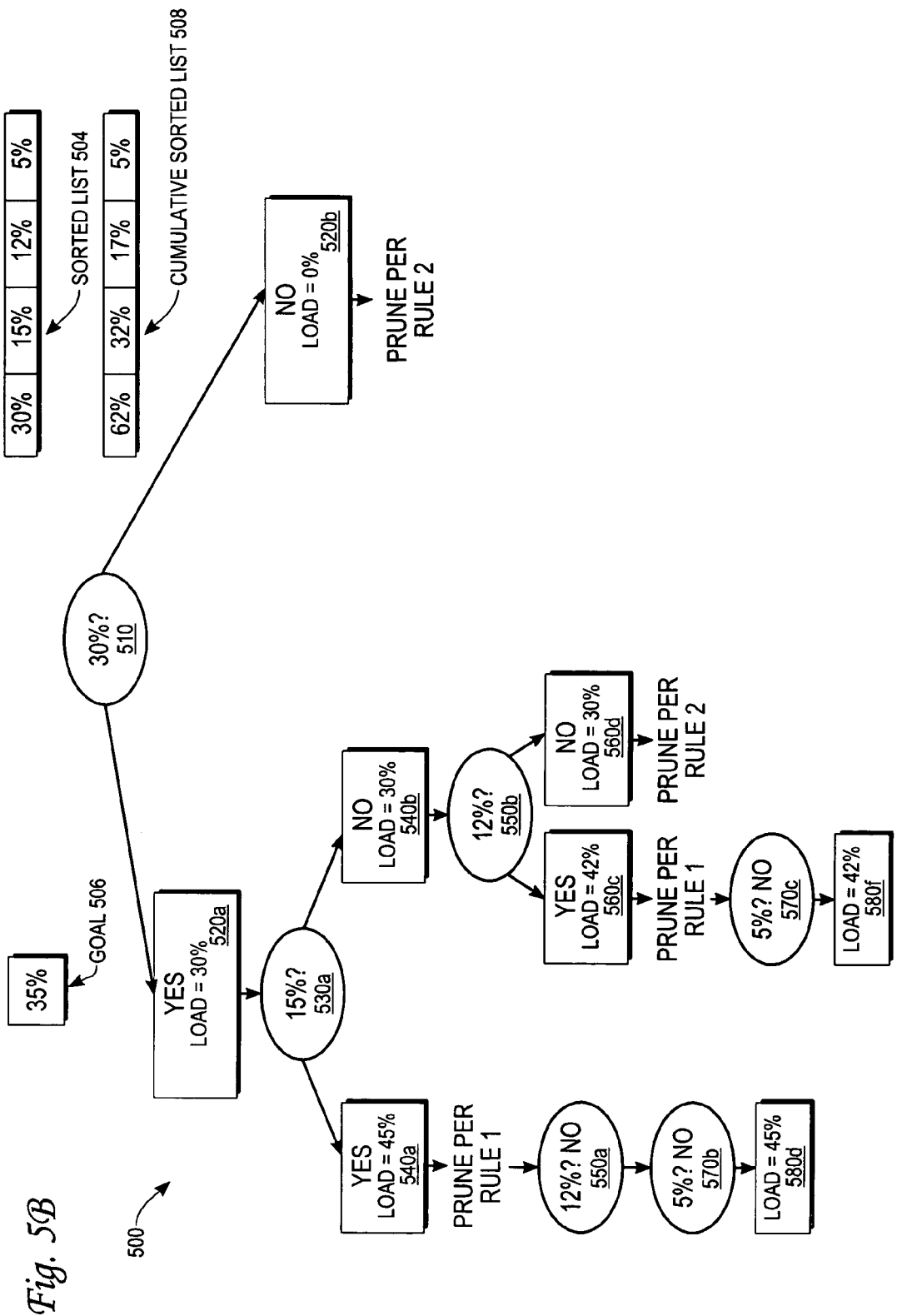
FIG. 5B is a block diagram that depicts the depth first search tree with pruning for use in redistributing interrupt loads between two processors, according to an embodiment.

For the immediately following example and discussion of FIG. 5A, pruning techniques are not applied, whereas the subsequent example of FIG. 5B does incorporate pruning techniques in the context of redistributing interrupt loads between two processors.

FIG. 5A is a block diagram that depicts a depth first search tree 500 without pruning for use in redistributing interrupt loads between two processors, according to an embodiment. For the example depicted in FIG. 5, assume that the high load processor has a total interrupt load of 47% consisting of three interrupt loads of 30%, 12%, and 5% and that the low load processor has one interrupt load of 15%. Further assume that the average total interrupt load per processor is 35% and that the margin is 0.1 (or 10% in terms of interrupt load).

Note that FIG. 5 represents a very simple situation in which there are a total of only four interrupt loads between the two processors, whereas in a typical implementation, the total number of interrupt loads between the two processors may number a dozen or much more, and some interrupt loads may be just a fraction of a percent of the total processing capacity of a particular processor.

Before creating depth first search tree 500, a sorted list of the interrupt loads is created, listing the individual interrupt loads from highest to lowest, as represented by sorted list 504. Because there are four interrupt loads, there are four levels in depth first search tree 500, one level per interrupt load. Starting with the topmost level, a decision is made at each level whether or not to assign the corresponding interrupt load to the high load processor, such as through a "YES/NO" formulation. Depending on whether or not the particular interrupt load is assigned to the high load processor, the total interrupt load so far is determined and used as the starting point for the next lower level. At the last level, all possible permutations of distributing the interrupts to the high load processor are represented, from which the best result can be selected based on one or more criteria, as described further herein.

In block 510, which is at the highest level of depth first search tree 500, the interrupt load is the largest load of 30%, and the decision is whether or not to put the 30% load on the high load processor.

Blocks 520a and 520b represent saying "YES" and "NO" to putting the 30% load on the high load processor, respectively. In block 520a, the 30% load is added to the high load processor, and the total load so far for the high load processor is 30%. In block 520b, the 30% is not added to the high load processor, and the total load so far is 0%.

At the second level of depth first search tree 500, the interrupt load under consideration is the second largest interrupt load of 15%, and the decision in blocks 530a and 530b is whether or not to add the 15% interrupt load to the high load processor. Blocks 540a and 540b represent saying "YES" and "NO," respectively, to putting the 15% load onto the high load processor that already as the 30% load. Similarly, blocks 540c and 540d represent saying "YES" and "NO," respectively, to putting the 15% load onto the high load processor that so far has no load.

Therefore, in block 540a, when the 15% load is included, the total interrupt load so far for the high load processor is 45%, whereas in block 540b, then the 15% load is not included, the total interrupt load so far is still 30%. Similarly, in blocks 540c and 540d, the total interrupt load is 15% and 0%, respectively.

At the third level of depth first search tree 500, the interrupt load under consideration is the 12% load, and the decision in blocks 550a through 550d is whether or not to add the 12% load to the high load processor. Blocks 560a through 560h represent saying either "YES" or "NO" to adding the 12% load to the high load processor, based on the current loads on the high load processor, as represented by blocks 540a through 540d.

Finally, at the fourth level of depth first search tree 500, the interrupt load under consideration is the last load, the 5% load, and the decision in blocks 570a through 570h is whether or not to add the 5% load to the high load processor. Blocks 580a through 580p represent saying either "YES" or "NO" to adding the 5% load to the high load processor, based on the current loads on the high load processor, as represented by blocks 560a through 560h.

Blocks 580a through 580p represent the 16 possible permutations of distributing the four interrupt loads of sorted list 504 among two processors, with the load depicted in each of blocks 580a through 580p showing the total interrupt load on the high load processor for that particular permutation. The total interrupt load on the low load processor is the total possible load (e.g., 62%) less the particular total interrupt load on the high load processor for that permutation.

The distribution of the individual loads is determined based on the "YES" and "NO" answers that apply to reach a particular block of blocks 580a through 580p. For example, block 580a can be represented as "62%, YES, YES, YES, YES" since each interrupt load was included to reach block 580a, and the sum of the interrupt loads included on the high load processor is 62%. As another example, block 580j can be represented as "27%, NO, YES, YES, NO" since only the 15% and 12% (e.g., the second and third loads) are included to reach block 580j.

From blocks 580a through 580p, the best permutation can be selected based on one or more criteria. For example, if the criteria is that the high load processor should have a total interrupt load above the average total interrupt load, then a total interrupt load that is greater than 35% is acceptable. As another example, an additional criterion can be that the high load processor should have a total interrupt load above the average total load of the high load processor and the low load processor. This additional criteria is another way to formulate the rule described above that the high load processor should remain the high load processor, which is the case when the high load processor is above the average of the high load and low load processors.

If there is more than one acceptable result, then another criteria can be used to select the best result from among multiple acceptable results. For example, because the goal is to redistribute the interrupt loads to obtain a better balance of the loads among the processors, the best answer can be selected as the lowest total interrupt load from among the acceptable results. Therefore, in the example in which 580d and 580f with total interrupt loads of 45% and 42%, respectively, the best answer results is represented by block 580f with a total interrupt load of 42%, since 42% is the smallest acceptable result.

Recall from the previous discussion of redistributing interrupt loads between two processors, one or more rules can be applied. For example, as described above, three rules that can be used are (1) after redistribution, the high load processor should remain the high load processor, (2) after redistribution, the high load processor's load should be reduced so as approach the average total interrupt load per processor as closely as possible and (3) if the highest interrupt load between the two processors is already on the high load processor, that highest interrupt load remains on the high load processor (or in the alternate formulation, after redistribution, the high load processor's load remains above the average of the high load processor and the low load processor). One, two, or all of these rules can be used to exclude one or more of the possible results, in addition to or in lieu of the other acceptance criteria, as described above.

For example, the two acceptable results of blocks 580d and 580f have total interrupt loads of 45% and 42%, respectively. Block 580d can be represented as "45%, YES, YES, NO, NO," while block 580f can be represented as "42%, YES, NO, YES, NO. For block 580d, the low load processor has a total interrupt load of 17% (e.g., 62%−45%), which means that while the high load processor retains the 30% load, the 12% and 5% loads originally on the high load processor are moved to the low load processor, while the 15% load originally on the low load processor moves to the high load processor. Similarly, for block 580f, the high load processor retains the 30% and 12% interrupt loads, with the 5% load being moved to the low load processor, which now has a total interrupt load of 20% (e.g., 15% plus 5%). Checking the three rules shows that the first and third rules are satisfied by either the distribution represented by block 580d or block 580f because the highest individual interrupt load that was originally on the high load processor remains on the high load processor for both results and the high load processor's total interrupt load is still larger than that of the low load processor's (e.g., 47% vs. 15% for block 580d and 45% vs. 17% for block 580f, or in the alternate formulation, both 47% and 45% are greater than the average of 31% based on the original loads of 47% and 15%).

As another example, block 580h can be represented as "30%, YES, NO, NO, NO," meaning that for this result, the high load processor retains the 30% interrupt load, while the 12% and 5% loads are moved to the low load processor that retains the 15% load. However, the resulting total interrupt load for the low load processor is then 32%, which means that after redistributing the loads, the high load processor is no longer the high load processor. Thus, the first rule is not satisfied, and the result of 580h can be discarded if not already discarded based on one or more other rules or acceptance criteria. However, with the result of 580h, the third rule is satisfied because the largest individual interrupt load, the 30% load, remains on the high load processor.

As yet another example, block 580j can be represented as "27%, NO, YES, YES, NO," meaning that the high load processor has the 15% and 12% loads, whereas the low load processor has the 30% and 5% loads. In this example, the first and third rules are violated, because the high load processor is no longer the high load processor, and because the highest individual load that was on the high load processor has been moved to the low load processor. In fact, for any of the results represented by blocks 580i through 580p, the third rule is always violated because the 30% load is no longer on the high load processor, as a result of answering "NO" in block 520b. However, while for any of the results represented by blocks 580j through 580p, the first rule is also violated because the highest load for the high load processor (e.g., 27% from block 580j) is less than the load for the low load processor (e.g., 35% from block 580j), the result in block 580i does satisfy the first rule because the high load processor has a load of 32% while the low load processor has a load of 30%.

However, if different criteria were used, a different permutation might be the best result. For example, if the goal is to have the high load processor's new total interrupt load as close to the average total interrupt load of 35% as possible while still being at or above 35% (instead of only above 35% as in the previous example), then the best permutation is represented by block 580g. Block 580g is represented as "35%, YES, NO, NO, YES," and means that the high load processor retains the 30% and 5% loads, while the 12% interrupt load is moved to the low load processor, resulting in a total interrupt load of 27%. Again, checking the rules, all are satisfied because the high load processor remains the high load processor, the result is as close to the average total interrupt load as possible but still above that value, and the highest individual load that was on the high load processor remains on the high load processor.

6.2 Depth First Search with Pruning

As discussed above, one or more rules can be used to prune the depth first search tree, thereby eliminating the need to explicitly evaluate the permutations that are represented by the portion of the depth first search tree that is being pruned. The pruning rules that are applied are determined based on the particular application and the criteria being used to select the best result from the depth first search.

FIG. 5B is a block diagram that depicts depth first search tree 500 with pruning for use in redistributing interrupt loads between two processors, according to an embodiment. FIG. 5B is based upon FIG. 5A, and therefore the similarities between FIG. 5B and FIG. 5A will not be discussed again herein. Rather, the following discussion focuses on applying pruning rules to depth first search tree 500 to illustrate which portions can be eliminated, or "pruned," according to the pruning rules, thereby reducing the amount of computational resources required to determine the best redistribution of the interrupt loads between the two selected processors. Finally, FIG. 5B includes goal 506 to denote the goal or target interrupt load for the high load processor of 35% in this example, to aid in understanding the application of the pruning rules.

In the example of FIG. 5B, there are two different pruning rules being applied. However, in other implementations, fewer pruning rules, additional pruning rules, or modifications of the following pruning rules can be used. The two pruning rules for the following example are as follows, and explanations and examples for each rule are provided below:

Rule 1—When an acceptable result is identified, prune everything below the acceptable result in the depth first search tree. This rule means that once an acceptable result is obtained, there is no reason to consider whether to add any additional interrupts, since adding anything more produces a larger result that is further away from the goal. Thus, the implication of pruning below the acceptable result is that for all interrupts below the acceptable result, "NO" is selected, and thus the branch of depth first search tree 500 can be represented by the final result reached by selecting "NO" to all the remaining loads.

Rule 2—If selecting "YES" to every load below a position in the tree would not result in a total interrupt load on the high load processor that is above the goal, prune everything below that position. This rule means that there can be a point in the tree below which no acceptable result can be obtained even if "YES" is selected for all remaining interrupts.

6.2.1 Pruning Rule 1

Rule 1 is based on the goal of the depth first search, namely to find a total interrupt load that is as close to but still above the average total interrupt load per processor. Once the total interrupt load for a particular position within the dept first search tree is acceptable, any additional interrupt loads that are below that particular position in the depth first search tree are found by either adding at least one more interrupt load or by not adding any further interrupt loads. Because the addition of any more interrupt loads will increase the total interrupt load, all such results are not as good as the result from the particular position. Also, not adding any more interrupt loads does not change the result. Thus, once an acceptable result is found, the depth first search tree can be pruned from that point onward to the bottom of the tree.

For example, at block 540a, the total interrupt load is 45%, which is an acceptable result because 45% is above the goal of the average total interrupt load per processor of 35%. Prior to block 540a, there was no acceptable answer, and therefore, the result of 45% in block 540a represents the first acceptable result in the corresponding branch of depth first search tree 500. Therefore, according to Rule 1, all selections below block 540a are "NO" as depicted in FIG. 5A, thereby eliminating explicit consideration of the other interrupts (e.g., blocks 560a, 560b, 570a, and 580a through 580c), leaving block 580d as the final result for that branch of depth first search tree 500 as depicted in FIG. 5B.

In comparing the result of 45% from block 540a to the results from blocks 580a through 580d in FIG. 5A, the best result in terms of the total interrupt load is 45% in block 580d. Thus, by applying Rule 1, the computations necessary to generate the pruned portion of depth first search tree 500 can be avoided, since such computations do not improve the result obtained for that branch of depth first search tree 500.

Similarly, when the total interrupt load of 42% of block 560c is reached, the result of 42% is the new best answer, since it is both an acceptable result when compared to the goal of 35% and better than the than the previous best result of 45% from block 540a. As a result, the new result of 42% becomes the new best result, and according to Rule 1, everything below block 560c depicted in FIG. 5A can be pruned (e.g., blocks 580e and 580f), leaving block 560c as the result for that branch of depth first search tree 500, as depicted in FIG. 5B.

6.2.2 Pruning Rule 2

Rule 2 is based on being unable to add enough interrupt loads to obtain an acceptable result. The levels of depth first search tree 500 are organized by considering the individual interrupt loads from largest to smallest, and therefore at any level, the total possible load that can be added thereafter can be determined.

For example, depth first search tree 500 includes a cumulative sorted list 508 that represents the total cumulative interrupt load corresponding to the individual interrupt loads of sorted list 504. Specifically, the first entry in cumulative sorted list 508 is 62%, which is the total cumulative interrupt load starting with the 30% individual interrupt load and all smaller interrupt loads (e.g., the 15%, 12%, and 5% loads). Similarly, the second entry in cumulative sorted list 508 is 32%, which is the total cumulative interrupt load starting with the 15% individual interrupt load and all smaller interrupt loads (e.g., the 12% and 5% loads). The third and fourth entries of cumulative sorted list 508 are determined in a similar manner.

By using cumulative sorted list 508, the cumulative interrupt load for all loads below a particular level in depth first search tree 500 can be determined and added to the current result for a particular block to determine if Rule 2 results in pruning the branch below the particular block. For example, in block 560d, the total interrupt load is 30%. The next level corresponds to the 5% interrupt load, for which the cumulative interrupt load is also 5%, according to cumulative sorted list 508 (e.g., 5% is the last entry). Because adding 5% to the result of 30% in block 560d results in a total interrupt load of only 35%, and an acceptable result must be greater than 35% (e.g., greater than the average total interrupt load of 35%), everything below block 560d can be pruned according to Rule 2, as depicted in FIG. 5B.

As another example, in block 520b, the total interrupt load is 0%. The next level corresponds to the 15% interrupt load, for which the cumulative interrupt load is 32%, according to cumulative sorted list 508 (e.g., 32% is the second entry, which corresponds to 15% being the second entry in sorted list 504). Because adding 32% to the result of 0% in block 520b results in a total interrupt load of only 32%, and an acceptable result must be greater than 35%, everything below block 560d can be pruned according to Rule 2, as depicted in FIG. 5B.

6.2.3 Final Result of Applying Pruning Rules

By comparing FIG. 5A, in which no pruning rules were applied, and FIG. 5B, in which the two examples of pruning rules were applied, the reduction in computations necessary to identify the best result can be evaluated. Specifically, in FIG. 5A, a total of 15 "YES/NO" determinations are evaluated, while in FIG. 5B, only 3 "YES/NO" determinations are evaluated. In a more realistic interrupt load redistribution situation in which there are a large number of individual interrupt loads and not just the four of FIG. 5A and FIG. 5B, the reduction in the work required to identify the best result can significant.

6.3 Breadth First Search

Instead of using a depth first search in which permutations are evaluated until a branch ends, either by exhausting all the possibilities or by pruning, which processes the branches from left to right, a breadth first search can be used in which all permutations are evaluated at each level of the tree before moving down to the next level. For example, in FIG. 5A, the "YES/NO" determination for the 30% load is first performed, then both the "YES/NO" determinations for the 15% load, then the four determinations for the 12% load, and finally the eight determinations for the 5% load.

Generally, using depth first search instead of breadth first search can minimize the amount of information that must be tracked at a given time, plus depth first search can be easier to implement via software code than breadth first search. However, breadth first search can still be used in other implementations, if desired, with or without the pruning rules as described above.

7.0 Additional Features

The following are additional features than can be implemented with the approaches described herein, including: automating the selection of values, grouping interrupts on processors based on priority, and varying the number of processors among with interrupts are distributed (e.g., from a broad distribution among many processors to a tight distribution among only a few processors). Any of the following additional features can be combined one or more additional features as well as with any of the features described above in a particular implementation.

7.1 Automating the Selection of Values

In the approaches described herein, one or more of the values can be determined based on current and past information, instead of being specified in the source code of the interrupt daemon or being supplied by a user. As a result, the interrupt daemon can be self-regulating by adjusting such values, such as by making increases or decreases according to one or more criteria, although the final values can still be limited to a specified range so that the values are not adjusted beyond the allowed range.

For example, in describing FIG. 2 above, interrupt daemon 140 sleeps for a specified time period, such as 10 seconds. However, in another embodiment, interrupt daemon 140 self-regulates the amount of sleep time in between imbalance checks based on the processing resources used by interrupt daemon 140 in the imbalance checks.

For example, interrupt daemon 140 can be configured with to have a minimum sleep time of 1 second and a maximum sleep time of 15 seconds. Interrupt daemon 140 then queries the processor upon which interrupt daemon 140 is executing to determine the load on the processor from interrupt daemon 140 itself. If the load on the processor from interrupt daemon 140 is above a specified amount, for example 2% of the total processor capacity, the sleep time is increased to the maximum allowed sleep time, so as to minimize the impact of the imbalance detection on the processor. In other implementations, other minimum and maximum sleep times can be used, along with other approaches fro self-regulating the amount of sleep time besides maintaining a value within a specified range defined by a minimum and a maximum value.

Conversely, if the load on the processor from interrupt daemon 140 is less than a specified amount, for example 0.1% of the total processor capacity, the sleep time is decreased by 50% so that imbalance checks are performed twice as often. In this situation, the impact of interrupt daemon 140 on the processor is very small, and therefore, more frequent imbalance checks can be performed with a relatively small impact on the processor on which interrupt daemon 140 is executing, which can improve the overall approach by providing more load data more often and being able to detect imbalances faster and potentially reassigning interrupts sooner than would otherwise be the case.

Similarly, if the interrupt daemon is configured to make interrupt imbalance measurements at periodic intervals based on a clock time instead of using a specified sleep period, the interrupt daemon can make adjustments to the clock times that trigger new measurements based on the extent to which processing resources are being used for the imbalance measurements.

In addition to having the sleep period, or the clock interval, adjusted based on performance, other values can be adjusted by the interrupt daemon itself. For example, the value of the margin can be adjusted based on the frequency of reassignment attempts or the amount of processing resources expended on the reassignment attempts. Thus, if reassignments are determined to be too frequent or too much processing is being used in the reassignments, the margin can be increased to lessen the performance impact of reassignment attempts. Conversely, if the reassignment attempts are not frequent enough, the margin can be decreased, thereby resulting in detecting an imbalance sooner and most likely more frequent reassignment attempts. As with the sleep period example above, the adjustments can be limited so that the selected value falls within a range of values, such as between a specified minimum and a specified maximum, which can be specified either in the source code of the interrupt daemon itself, by a user, or some combination thereof.

7.2 Grouping Interrupts on Processors Based on Priority

In the examples above, no consideration is given to the priority of the interrupts when redistributing interrupts between processors. However, in other implementations, interrupts can be distributed based on priority, so as to avoid situations in which a higher priority interrupt delays the processing of a lower priority interrupt, or in an extreme case, effectively prevents the processing of the lower priority interrupt by the higher priority interrupt using 100% of the processor's processing capacity.

For example, if network controller interrupts have a priority interrupt level (PIL) of 6 and disk drive interrupts have a PIL of 4, interrupts can be distributed so that each processor handles interrupts with the same priority (e.g., the processor only handles interrupts with a PIL of 6 or with a PIL of 4, but not both). As a specific example, when redistributing interrupts between two processors, another rule can specify that the high load processor is only assigned interrupts with one particular PIL value, while interrupts with any other PIL value are assigned to the low load processor.

As another specific example, each processor can be designated as handling interrupts of one specified priority, and when interrupts are redistributed between processors, only those processors designated as handling the specified priority are considered. Thus, interrupts with a PIL of 6 are redistributed among processors designed as handling PIL 6 interrupts. The imbalance detection and reassignment processes described above can then be implemented separately for the processors of the specified priority level independent of imbalance detection and reassignment for processors handling interrupts with another priority level.

One benefit of using interrupt priority to distribute interrupts among the processors is that higher priority interrupts would be less likely or even prevented from keeping lower priority interrupts from being handled in extreme situations. However, when distributing interrupts based on priority, the overall interrupt distribution is likely to not be as balanced since interrupts for some priorities, such as network controller interrupts, may at times be more resource intensive than others. However, since the average load for interrupts of some priorities may generally be larger than the average load for interrupts of other priority levels, the system can be configured to minimize or avoid having some applications assigned to the processors handling the high priority, high load interrupts, thereby reducing the impact of such high priority, high load interrupts on application performance.

7.3 Tight vs. Broad Distributions of Interrupts Among Processors

In the examples above, the number of processors handling interrupts is not specified, only that interrupt eligible processors are considered when distributing interrupts (e.g., a processor that is designated as being ineligible to process interrupts is ignored when generating the mapping of interrupts to processors). However, different implementations can use a smaller or larger number of processors for handling the processing of interrupts.

For example, a "broad" distribution of interrupts would use most, if not all, of the processors that are included in the system. In contrast, a "tight" distribution would use only a few of the processors in the system. The average total interrupt load per processor will be less with a broad distribution than with a tight distribution, but by limiting the number of processors handling interrupts to a smaller number, the remaining processors can be primarily dedicated to application processing, thereby helping to limit any potential adverse impact on application performance due to interrupt processing. Also, by grouping the interrupts onto fewer processors, the effectiveness of warm caches can be increased because there is less changing back and forth between processing applications and interrupts as in a broad distribution. However, with a tight distribution of interrupts, there is an increased risk that an abnormal situation, such as a network attack that results in a large network controller interrupt load, can overwhelm the interrupt eligible processors and thereby impact system performance to an undesirable degree.

As a specific example, a tight distribution of interrupts would use only a relatively small number of processors from the total number of processors that are available. As a specific example, in a system with 100 processors, 5 processors are designated as interrupt eligible, which would be a tight distribution since the 95 remaining processors have no interrupts assigned for processing.

When using a tight distribution of interrupts, the system can be configured to add or remove processors from the short list of interrupt eligible processors, based on the total interrupt load of the interrupt eligible processors. For example, the average total load per processor exceeds a specified level in a tight distribution, such as 50%, the system can be configured to select a processor that is currently ineligible to process interrupts and change the selected processor to be interrupt eligible. Similarly, if a particular processor has an interrupt load that is too high, or too high for a sufficiently long time, the system can be configured to change the designation of another processor from interrupt ineligible to interrupt eligible. The processor can be selected based on one or more criteria, such as from a user provided list or by selecting the interrupt ineligible processor with the lowest total processing load over a certain time period. After a reassignment, the particular processor that had too high of an interrupt load is likely to have a smaller interrupt load due to the addition of the other processor to handle interrupts.

If an interrupt ineligible processor is selected to become an interrupt eligible processor, the system can be configured to move one or more applications or functions currently being performed by the selected processor to one or more other processors. Similarly, if a processor is selected to become an interrupt ineligible processor, one or more applications or functions currently handled by another processor can be transferred to the selected processor.

8.0 Implementation Mechanisms and Hardware Overview

The approach for distributing multiple interrupts among multiple processors described herein may be implemented in a variety of ways and the invention is not limited to any particular implementation. The approach may be integrated into a computing system or a computing device, or may be implemented as a stand-alone mechanism. Furthermore, the approach may be implemented in computer software, hardware, or a combination thereof.

Figure 6:
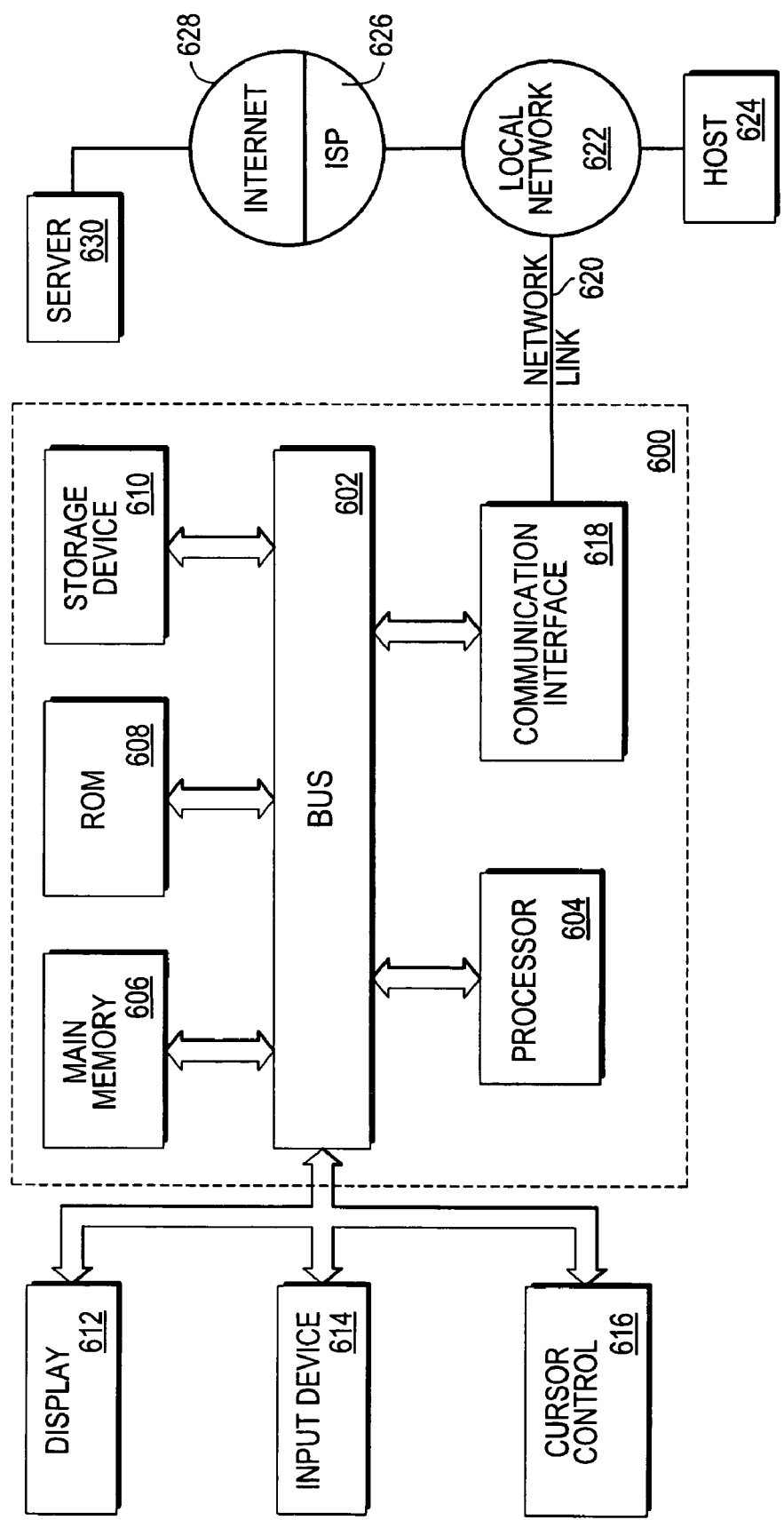
FIG. 6 is a block diagram that depicts a computer system upon which embodiments of the invention may be implemented.

FIG. 6 is a block diagram that depicts a computer system 600 upon which an embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

9.0 Extensions and Alternatives

In the foregoing description, the invention has been described with reference to specific embodiments thereof. It will, however, be evident that various modifications and changes may be made thereto without departing from the broader spirit and scope of the invention. For example, although examples have illustrated the use of a daemon to implement distributing interrupts among processors, a daemon is on type of application that is used for explanation purposes only, and embodiments of the invention are not limited to any particular type of application. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A machine-implemented method, comprising:
  causing a plurality of interrupts from one or more devices to be distributed to a plurality of processors in accordance with a first mapping that maps the interrupts to the processors;
  monitoring the processors to determine a workload imposed by the interrupts on each of the processors;
  deriving a first measure of imbalance based at least partially upon the workloads imposed by the interrupts on the processors;
  determining whether the first measure of imbalance differs from a baseline imbalance by at least a first margin;
  in response to a determination that the first measure of imbalance differs from the baseline imbalance by at least the first margin:
    generating a second mapping that maps the interrupts to the processors, wherein the second mapping is different from the first mapping;
    deriving a second measure of imbalance based at least partially upon workloads that would be, but have not yet been, imposed by the interrupts on the processors under the second mapping;
    determining whether the second measure of imbalance improves upon the first measure of imbalance by at least a second margin; and causing the interrupts to be distributed to the processors in accordance with the second mapping if and only if it is determined that the second measure of imbalance improves upon the first measure of imbalance by at least the second margin.

2. The method of claim 1, further comprising:
setting the second measure of imbalance as the baseline imbalance if it is determine that the second measure of imbalance improves upon the first measure of imbalance by at least the second margin.

3. The method of claim 1, further comprising:
continuing to cause the interrupts to be distributed to the processors in accordance with the first mapping if it is determined that the second measure of imbalance does not improve upon the first measure of imbalance by at least the second margin.

4. The method of claim 3, further comprising:
setting the first measure of imbalance as the baseline imbalance if it is determine that the second measure of imbalance does not improve upon the first measure of imbalance by at least the second margin.

5. The method of claim 1, wherein deriving the first measure of imbalance comprises:
deriving, for each of the processors, a heuristic based at least partially upon the workload imposed by the interrupts on that processor; and
deriving, based at least partially upon the heuristics for the processors, a system heuristic that represents the first measure of imbalance.

6. The method of claim 5, wherein deriving the second measure of imbalance comprises:
deriving, for each of the processors, a revised heuristic based at least partially upon workload that would be, but has not yet been, imposed by the interrupts on that processor under the second mapping; and
deriving, based at least partially upon the revised heuristics for the processors, a revised system heuristic that represents the second measure of imbalance.

7. The method of claim 1, wherein deriving the first measure of imbalance comprises:
determining an average interrupt load per processor based at least partially upon the workloads imposed by the interrupts on the processors under the first mapping;
for each processor:
determining a first value for that processor based upon the workload imposed on that processor by the interrupts under the first mapping less the average interrupt load, wherein if the first value is less than zero, it is set to zero;
determining a second value for that processor based upon the workload imposed on that processor by the interrupts under the first mapping less a largest load imposed by an individual interrupt on that processor;
determining a third value for that processor as a minimum value from among the first and second values for that processor;
if the workload imposed on that processor by the interrupts under the first mapping satisfies a specified relationship with a criterion, setting the third value for that processor equal to a specified value; and
setting the first measure of imbalance equal to a largest third value from among all of the third values determined for the processors.

8. The method of claim 1, wherein deriving the second measure of imbalance comprises:
determining an average interrupt load per processor based at least partially upon workloads that would be, but have not yet been, imposed by the interrupts on the processors under the second mapping;
for each processor:
determining a first value for that processor based upon a workload that would be imposed on that processor by the interrupts under the second mapping less the average interrupt load, wherein if the first value is less than zero, it is set to zero;
determining a second value for that processor based upon the workload that would be imposed on that processor by the interrupts under the second mapping less a largest load that would be imposed by an individual interrupt on that processor;
determining a third value for that processor as a minimum value from among the first and second values for that processor;
if the workload that would be imposed on that processor by the interrupts under the second mapping satisfies a specified relationship with a criterion, setting the third value for that processor equal to a specified value; and
setting the second measure of imbalance equal to a largest third value from among all of the third values determined for the processors.

9. The method of claim 1, wherein generating the second mapping comprises:
selecting a first processor from the plurality of processor, wherein the first processor has a first initial interrupt workload based upon a first set of one or more interrupts handled by the first processor under the first mapping, wherein the first initial interrupt workload is greater than an average interrupt workload per processor;
selecting a second processor from the plurality of processor, wherein the second processor has a second initial interrupt workload based upon a second set of one or more interrupts handled by the second processor under the first mapping, wherein the second initial interrupt workload is less than the average interrupt workload per processor; and
redistributing individual interrupts from the first set of interrupts and the second set of interrupts among the first process and the second processor, such that after redistributing, a first revised interrupt workload for the first processor is (a) less than the first initial interrupt workload for the first processor, (b) greater than the average interrupt workload per processor, and (c) greater than a second revised interrupt workload for the second processor.

10. The method of claim 9, wherein redistributing individual interrupts from the first set of interrupts and the second set of interrupts among the first process and the second processor comprises:
performing an optimization search based at least partially upon the first set of interrupts and the second set of interrupts, wherein the optimization search is selected from the group consisting of a depth first search and a breadth first search.

11. The method of claim 9, wherein redistributing individual interrupts from the first set of interrupts and the second set of interrupts among the first process and the second processor comprises:
performing an optimization search based at least partially upon the first set of interrupts and the second set of interrupts, wherein the optimization search is selected from the group consisting of a depth first search and a breadth first search, and wherein the optimization search is organized based upon a hierarchy; and eliminating at least a portion of the hierarchy based at least partially on a rule that is selected from the group consisting of (a) a first rule that specifies that when a result greater than a specified goal is identified, one or more possible results of the hierarchy are not evaluated, and (b) a second rule that specifies that when including all remaining interrupts on the first processor would not provide the result greater than the specified goal, one or more possible results of the hierarchy are not evaluated.

12. The method of claim 1, wherein the first and second margins may be the same margin or different margins.

13. A machine readable storage medium storing instructions which, when executed by a computer system, cause the computer system to perform the operations of:

causing a plurality of interrupts from one or more devices to be distributed to a plurality of processors in accordance with a first mapping that maps the interrupts to the processors;

monitoring the processors to determine a workload imposed by the interrupts on each of the processors;

deriving a first measure of imbalance based at least partially upon the workloads imposed by the interrupts on the processors;

determining whether the first measure of imbalance differs from a baseline imbalance by at least a first margin;

in response to a determination that the first measure of imbalance differs from the baseline imbalance by at least the first margin:

generating a second mapping that maps the interrupts to the processors, wherein the second mapping is different from the first mapping;

deriving a second measure of imbalance based at least partially upon workloads that would be, but have not yet been, imposed by the interrupts on the processors under the second mapping;

determining whether the second measure of imbalance improves upon the first measure of imbalance by at least a second margin; and causing the interrupts to be distributed to the processors in accordance with the second mapping if and only if it is determined that the second measure of imbalance improves upon the first measure of imbalance by at least the second margin.

14. The machine readable storage medium of claim 13, wherein the instructions cause the computer system to further perform the operations of:

setting the second measure of imbalance as the baseline imbalance if it is determine that the second measure of imbalance improves upon the first measure of imbalance by at least the second margin.

15. The machine readable storage medium of claim 13, wherein the instructions cause the computer system to further perform the operations of:

continuing to cause the interrupts to be distributed to the processors in accordance with the first mapping if it is determined that the second measure of imbalance does not improve upon the first measure of imbalance by at least the second margin.

16. The machine readable storage medium of claim 15, wherein the instructions cause the computer system to further perform the operations of:

setting the first measure of imbalance as the baseline imbalance if it is determine that the second measure of imbalance does not improve upon the first measure of imbalance by at least the second margin.

17. The machine readable storage medium of claim 13, wherein deriving the first measure of imbalance comprises:

deriving, for each of the processors, a heuristic based at least partially upon the workload imposed by the interrupts on that processor; and deriving, based at least partially upon the heuristics for the processors, a system heuristic that represents the first measure of imbalance.

18. The machine readable storage medium of claim 17, wherein deriving the second measure of imbalance comprises:

deriving, for each of the processors, a revised heuristic based at least partially upon workload that would be, but has not yet been, imposed by the interrupts on that processor under the second mapping; and deriving, based at least partially upon the revised heuristics for the processors, a revised system heuristic that represents the second measure of imbalance.

19. The machine readable storage medium of claim 13, wherein deriving the first measure of imbalance comprises:

determining an average interrupt load per processor based at least partially upon the workloads imposed by the interrupts on the processors under the first mapping;

for each processor:

determining a first value for that processor based upon the workload imposed on that processor by the interrupts under the first mapping less the average interrupt load, wherein if the first value is less than zero, it is set to zero;

determining a second value for that processor based upon the workload imposed on that processor by the interrupts under the first mapping less a largest load imposed by an individual interrupt on that processor;

determining a third value for that processor as a minimum value from among the first and second values for that processor;

if the workload imposed on that processor by the interrupts under the first mapping satisfies a specified relationship with a criterion, setting the third value for that processor equal to a specified value; and setting the first measure of imbalance equal to a largest third value from among all of the third values determined for the processors.

20. The machine readable storage medium of claim 13, wherein deriving the second measure of imbalance comprises:

determining an average interrupt load per processor based at least partially upon workloads that would be, but have not yet been, imposed by the interrupts on the processors under the second mapping;

for each processor:

determining a first value for that processor based upon a workload that would be imposed on that processor by the interrupts under the second mapping less the average interrupt load, wherein if the first value is less than zero, it is set to zero;

determining a second value for that processor based upon the workload that would be imposed on that processor by the interrupts under the second mapping less a largest load that would be imposed by an individual interrupt on that processor;

determining a third value for that processor as a minimum value from among the first and second values for that processor;

if the workload that would be imposed on that processor by the interrupts under the second mapping satisfies a specified relationship with a criterion, setting the third value for that processor equal to a specified value; and setting the second measure of imbalance equal to a largest third value from among all of the third values determined for the processors.

21. The machine readable storage medium of claim 13, wherein generating the second mapping comprises:

selecting a first processor from the plurality of processor, wherein the first processor has a first initial interrupt workload based upon a first set of one or more interrupts handled by the first processor under the first mapping, wherein the first initial interrupt workload is greater than an average interrupt workload per processor;

selecting a second processor from the plurality of processor, wherein the second processor has a second initial interrupt workload based upon a second set of one or more interrupts handled by the second processor under the first mapping, wherein the second initial interrupt workload is less than the average interrupt workload per processor; and redistributing individual interrupts from the first set of interrupts and the second set of interrupts among the first process and the second processor, such that after redistributing, a first revised interrupt workload for the first processor is (a) less than the first initial interrupt workload for the first processor, (b) greater than the average interrupt workload per processor, and (c) greater than a second revised interrupt workload for the second processor.

22. The machine readable storage medium of claim 21, wherein redistributing individual interrupts from the first set of interrupts and the second set of interrupts among the first process and the second processor comprises:

performing an optimization search based at least partially upon the first set of interrupts and the second set of interrupts, wherein the optimization search is selected from the group consisting of a depth first search and a breadth first search.

23. The machine readable storage medium of claim 21, wherein redistributing individual interrupts from the first set of interrupts and the second set of interrupts among the first process and the second processor comprises:

performing an optimization search based at least partially upon the first set of interrupts and the second set of interrupts, wherein the optimization search is selected from the group consisting of a depth first search and a breadth first search, and wherein the optimization search is organized based upon a hierarchy; and eliminating at least a portion of the hierarchy based at least partially on a rule that is selected from the group consisting of (a) a first rule that specifies that when a result greater than a specified goal is identified, one or more possible results of the hierarchy are not evaluated, and (b) a second rule that specifies that when including all remaining interrupts on the first processor would not provide the result greater than the specified goal, one or more possible results of the hierarchy are not evaluated.

24. The machine readable storage medium of claim 13, wherein the first and second margins may be the same margin or different margins.

* * * * *

UNITED STATES PATENT AND TRADEMARK OFFICE
CERTIFICATE OF CORRECTION

PATENT NO.       : 7,581,052 B1
APPLICATION NO.  : 11/210163
DATED            : August 25, 2009
INVENTOR(S)      : Ethan Solomita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fourteenth Day of September, 2010

David J. Kappos
*Director of the United States Patent and Trademark Office*